(12) United States Patent
Sturm et al.

(10) Patent No.: US 10,572,970 B2
(45) Date of Patent: Feb. 25, 2020

(54) EXTRACTING 2D FLOOR PLAN FROM 3D GRID REPRESENTATION OF INTERIOR SPACE

(71) Applicant: GOOGLE LLC, Mountain View, CA (US)

(72) Inventors: Jürgen Sturm, Munich (DE); Christoph Schütte, Munich (DE)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/954,154

(22) Filed: Apr. 16, 2018

(65) Prior Publication Data

US 2018/0315162 A1 Nov. 1, 2018

Related U.S. Application Data

(60) Provisional application No. 62/491,988, filed on Apr. 28, 2017.

(51) Int. Cl.
*G06T 3/00* (2006.01)
*G06T 15/10* (2011.01)
(Continued)

(52) U.S. Cl.
CPC ............ *G06T 3/0037* (2013.01); *G06T 15/10* (2013.01); *G06T 17/00* (2013.01); *H04N 5/2258* (2013.01);
(Continued)

(58) Field of Classification Search
CPC ....... G06T 17/20; G06T 17/205; G06F 17/50; G06F 17/5004
See application file for complete search history.

(56) References Cited

U.S. PATENT DOCUMENTS

2007/0229521 A1* 10/2007 Li .............................. G06T 1/60
345/543
2014/0301633 A1 10/2014 Furukawa et al.
(Continued)

OTHER PUBLICATIONS

Ho, Chien-Chang, et al. "Cubical marching squares: Adaptive feature preserving surface extraction from volume data." Computer graphics forum. vol. 24. No. 3. Oxford, UK and Boston, USA: Blackwell Publishing, Inc, 2005. (Year: 2005).*
(Continued)

*Primary Examiner* — Daniel F Hajnik

(57) ABSTRACT

An imaging camera and a depth camera are configured to perform a 3D scan of an interior space. A processor is configured to generate voxels in a three-dimensional (3D) grid based on the 3D scan. The voxels represent portions of the volume of the interior space. The processor is also configured to project the voxels onto tiles in a two-dimensional (2D) floor plan of the interior space. The processor is further configured to generate, based on the tiles, a 2D distance grid that represents features in the interior space. In some cases, the 2D distance grid is generated in real-time concurrently with performing the 3D scan of the interior space. The processor is further configured to generate, based on a 2D distance grid, a set of polygons representing elements of the floor plan in real-time. The processor is further configured to generate a simplified set of primitives representing the floor plan.

42 Claims, 20 Drawing Sheets

(51) Int. Cl.
G06T 17/00 (2006.01)
H04N 5/225 (2006.01)
H04N 13/271 (2018.01)
H04N 13/254 (2018.01)
H04N 13/239 (2018.01)
(52) U.S. Cl.
CPC ......... *H04N 13/239* (2018.05); *H04N 13/254* (2018.05); *H04N 13/271* (2018.05); *G06T 2210/04* (2013.01)

(56) References Cited

U.S. PATENT DOCUMENTS

| | | | |
|---|---|---|---|
| 2014/0368504 A1* | 12/2014 | Chen | G06T 17/005 345/424 |
| 2015/0063683 A1* | 3/2015 | Fu | G06K 9/00201 382/154 |
| 2015/0177948 A1* | 6/2015 | Sasaki | G08C 17/00 715/740 |
| 2015/0228114 A1* | 8/2015 | Shapira | G06T 17/10 345/421 |
| 2016/0103828 A1* | 4/2016 | Woolf | G06F 16/164 707/705 |
| 2019/0080463 A1* | 3/2019 | Davison | G05D 1/0253 |

OTHER PUBLICATIONS

Silberman, Nathan, and Rob Fergus. "Indoor scene segmentation using a structured light sensor." 2011 IEEE international conference on computer vision workshops (ICCV workshops). IEEE, 2011. (Year: 2011).*
Hayat, Munawar, et al. "A spatial layout and scale invariant feature representation for indoor scene classification." IEEE Transactions on Image Processing 25.10 (2016): 4829-4841. (Year: 2016).*
International Search Report and Written Opinion dated Jun. 29, 2018 for corresponding International Application No. PCT/US2018/029903, 13 pages.
Okorn, Brian et al., "Toward Automated Modeling of Floor Plans," Proceedings of the Symposium of 3D Data Processing, Visualization and Transmission 2010, Espace St. Martin, Paris, France; XP055089590; May 17, 2010; 8 pages.
Maple, C. "Geometric Design and Space Planning Using the Marching Squares and Marching Cube Algorithms," IEEE Proceedings of the 2003 International Conference on Geometric Modeling and Graphics XP055482923; ISBN: 978-0-7695-1985-2; Jul. 16-18, 2003; pp. 90-95.
Curless, et al., "A Volumetric Method for Building Complex Models from Range Images," SIGGRAPH '96 Proceedings of the 23rd annual conference on Computer graphics and interactive techniques, pp. 303-312, 1996, ACM, New York, NY, USA, 10 pages.
Isola, et al. "Image-to-Image Translation with Conditional Adversarial Networks," arXlv:1611.07004v1 [cs.CV] Nov. 21, 2016, 16 pages.
Buades, et al., "A non-local algorithm for image denoising," in CVPR, vol. 2, pp. 60-65, IEEE, 2005, 6 pages.
Chen, et al., "Semantic image segmentation with deep convolutional nets and fully connects CRFs," arXiv:1412.7062v4 Jun. 7, 2016, Published as Conference Paper at ICLR 2015, San Diego, CA, USA, May 7-9, 2015, 14 pages.
Chen, et al., "Sketch2Photo: Internet image montage," ACM Transactions on Graphics (TOG), 28(5): 124, 2009, 10 pages.
Cordts, et al., "The Cityscapes dataset for semantic urban scene understanding," in CVPR, 2016, 4 pages.
Denton, et al., "Deep generative image image models using a laplacian pyramid of adversarial networks," in NIPS, pp. 1486-1494, http://arxiv.org/abs/1506.05751, 2015, 9 pages.
Dosvitiskiy, et al., "Generating Images with perceptual similarity metrics based on deep networks," arXlv:1602.02644, 2016, 14 pages.
Efros, et al., "Image quilting for texture synthesis and transfer," in SIGGRAPH, pp. 341-346, ACM, 2001, 6 pages.
Efros, et al., "Texture synthesis by nonparametric sampling," in ICCV, vol. 2, pp. 1033-1038, IEEE, Corfu, Greece, 1999, 6 pages.
Eigen, et al., "Predicting depth, surface normals and semantic labels with a common multi-scale convolutional architecture," Proceedings of the IEEE International Conference on Computer Vision, 2015, Washington, D.C., USA, 9 pages.
Eitz, et al., "How do humans sketch objects?" ACM Trans. Graph. 31.4 (2012): 44-1, 9 pages.
Fergus, et al., "Removing camera shake from a single photograph." ACM transactions on graphics (TOG). vol. 25. No. 3. ACM, 2006, 8 pages.
Gatys, et al., "Image style transfer using convolutional neural networks," Computer Vision and Pattern Recognition (CVPR), 2016 IEEE Conference on. IEEE, 2016.
Gatys, et al., "Texture synthesis and the controlled generation of natural stimuli using convolutional neural networks." arXiv preprint arXiv:1505.07376 12 (2015), 9 pages.
Goodfellow, et al., "Generative adversarial nets." Advances in neural information processing systems, 2014, 9 pages.
Hertzmann, et al., "Image analogies," Proceedings of the 28th annual conference on Computer graphics and interactive techniques, ACM, 2001, 14 pages.
Hinton, et al., "Reducing the dimensionality of data with neural networks," science 313.5786 (2006): 504-507, 4 pages.
Iizuka, et al., "Let there be color!: joint end-to-end learning of global and local image priors for automatic image colorization with simultaneous classification," ACM Transactions on Graphics (TOG) 35.4 (2016): 110, 11 pages.
Ioffe, et al. "Batch normalization: Accelerating deep network training by reducing internal covariate shift," arXiv preprint arXiv:1502.03167 (2015).
Johnson, et al., "Perceptual losses for real-time style transfer and super-resolution," European Conference on Computer Vision, Amsterdam, The Netherlands, Springer, Cham, 2016.
Kingma, et al., "Adam: A method for stochastic optimization," arXiv preprint arXiv:1412.6980 (2014).
Laffont, et al., "Transient attributes for high-level understanding and editing of outdoor scenes." ACM Transactions on Graphics (TOG) 33.4 (2014): 149.
Larsen, et al., "Autoencoding beyond pixels using a learned similarity metric." arXiv preprint arXiv:1512.09300 (2015).
Larsson, et al., "Learning Representations for Automatic Colorization," arXiv:1603.06668v3 [cs.CV] Aug. 13, 2017, 29 pages.
Li, et al., "Combining markov random fields and convolutional neural networks for image synthesis." Proceedings of the IEEE Conference on Computer Vision and Pattern Recognition. 2016.
Li, et al., "Precomputed real-time texture synthesis with markovian generative adversarial networks." European Conference on Computer Vision. Springer, Cham, 2016.
Long, et al., "Fully convolutional networks for semantic segmentation." Proceedings of the IEEE conference on computer vision and pattern recognition. 2015.
Mathieu, et al., "Deep multi-scale video prediction beyond mean square error." arXiv preprint arXiv:1511.05440 (2015).
Mirza, et al., "Conditional generative adversarial nets." arXiv preprint arXiv:1411.1784 (2014).
Pathak, et al. "Context encoders: Feature learning by inpainting." Proceedings of the IEEE Conference on Computer Vision and Pattern Recognition. 2016.
Radford, et al., "Unsupervised representation learning with deep convolutional generative adversarial networks." arXiv preprint arXiv:1511.06434 (2015).
Tylecek, et al., "Spatial pattern templates for recognition of objects with regular structure." German Conference on Pattern Recognition. Springer, Berlin, Heidelberg, 2013.
Reed, et al., "Generative adversarial text to image synthesis," arXiv preprint arXiv:1605.05396 (2016).
Reinhard, et al., "Color transfer between images," IEEE Computer graphics and applications 21.5 (2001): 34-41.

(56) References Cited

OTHER PUBLICATIONS

Ronneberger, et al., "U-net: Convolutional networks for biomedical image segmentation," International Conference on Medical image computing and computer-assisted intervention, Springer, Cham, 2015.

Russakovsky, et al., "Imagenet large scale visual recognition challenge," International Journal of Computer Vision 115.3 (2015): 211-252.

Salimans, et al., "Improved techniques for training gans," Advances in Neural Information Processing Systems, 2016.

Shin, et al., "Data-driven hallucination of different times of day from a single outdoor photo," ACM Transactions on Graphics (TOG) 32.6 (2013): 200.

Ulyanov, et al., "Instance Normalization: The Missing Ingredient for Fast Stylization." arXiv preprint arXiv:1607.08022 (2016).

Wang, et al., "Generative image modeling using style and structure adversarial networks," European Conference on Computer Vision, Springer, Cham, 2016.

Wang, et al., et al. "Image quality assessment: from error visibility to structural similarity." IEEE transactions on image processing 13.4 (2004): 600-612.

Xie, et al., "Top-down learning for structured labeling with convolutional pseudoprior." European Conference on Computer Vision. Springer, Cham, 2016.

Xie, et al., "Holistically-nested edge detection." Proceedings of the IEEE international conference on computer vision. 2015.

Yoo, et al., "Pixel-level domain transfer." European Conference on Computer Vision. Springer, Cham, 2016.

Yu, et al., "Fine-grained visual comparisons with local learning." Proceedings of the IEEE Conference on Computer Vision and Pattern Recognition. 2014.

Zhang, et al., "Colorful image colorization." European Conference on Computer Vision. Springer, Cham, 2016.

Zhao, et al., "Energy-based generative adversarial network." arXiv preprint arXiv:1609.03126 (2016).

Zhou, et al., "Learning temporal transformations from time-lapse videos." European Conference on Computer Vision. Springer, Cham, 2016.

Zhu, et al., "Generative visual manipulation on the natural image manifold." European Conference on Computer Vision. Springer, Cham, 2016.

Ambrus, R. et al., "Automatic Room Segmentation From Unstructured 3-D Data of Indoor Environments", IEEE Robotics and Automation Letters, vol. 2, Issue 2; Apr. 2017, pp. 749-756.

Liu, Chen et al. "Raster-to-Vector: Revisiting Floorplan Transformation", International Conference on Computer Vision, 2017; accessed on Apr. 4, 2019 from «https://www.cse.wustl.edu/~chenliu/floorplan-transformation.html», 2 pages.

Murali, S. et al., "Indoor Scan2BIM: Building Information Models of House Interiors," IEEE/RSJ International Conference on Intelligent Robots and Systems (IROS), Sep. 24-28, 2017; 8 pages.

Wikipedia, "Summed-area table," accessed on Apr. 4, 2019 from «https://en.wikipedia.org/wiki/Summed-area_table», 2 pages.

Written Opinion of the International Preliminary Examining Authority dated Mar. 8, 2019 for corresponding International Application No. PCT/US2018/029903, 5 pages.

International Preliminary Report on Patentability dated Nov. 7, 2019 for corresponding International Application No. PCT/US2018/029903, 9 pages.

* cited by examiner

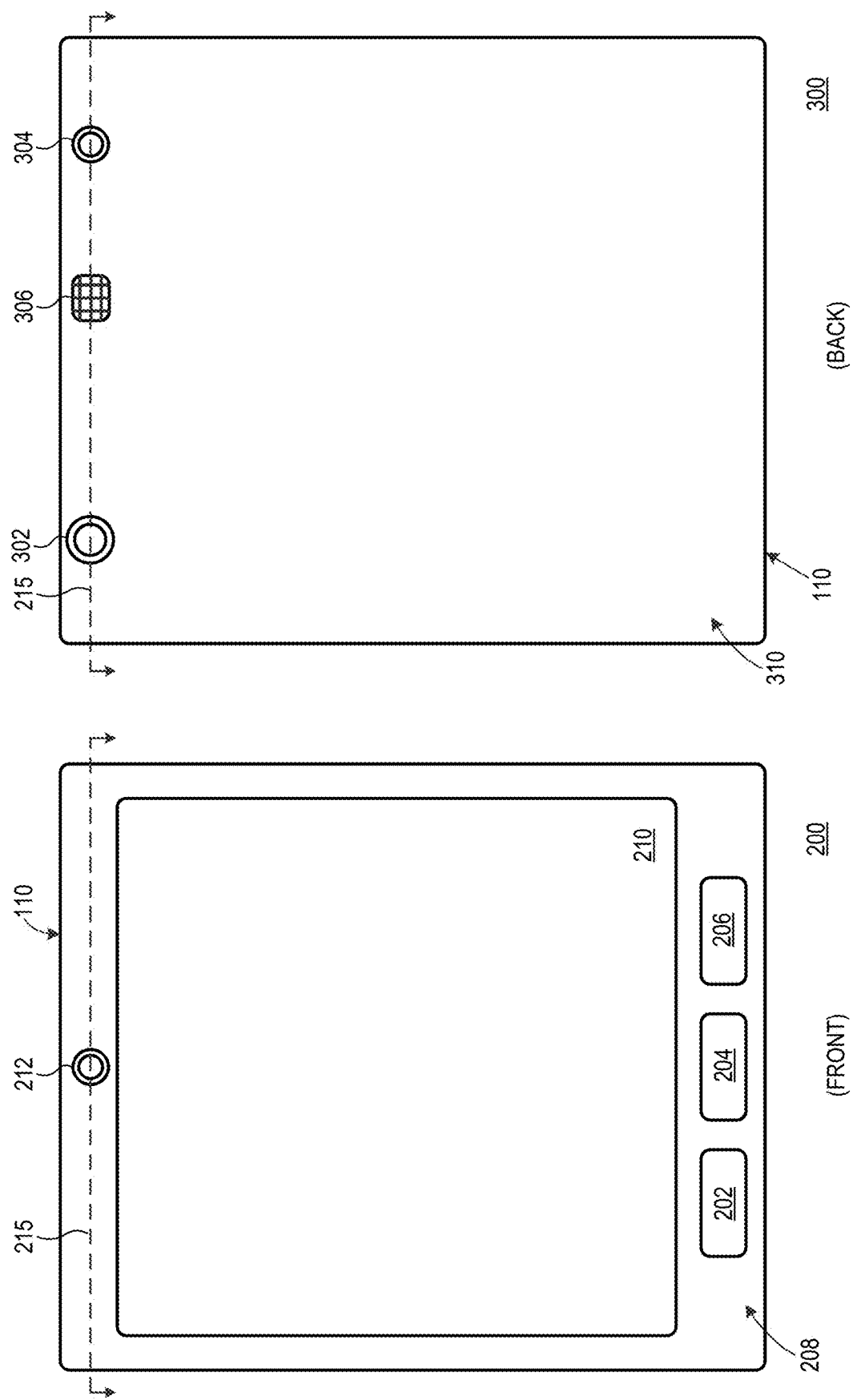

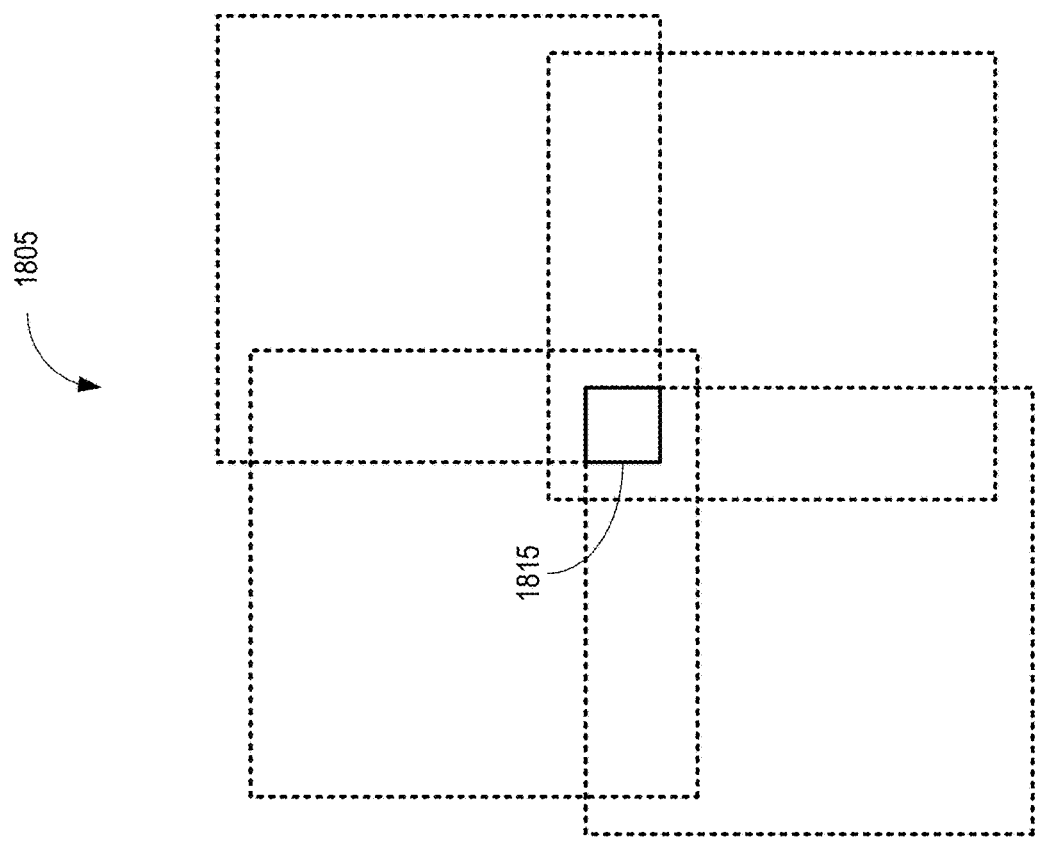
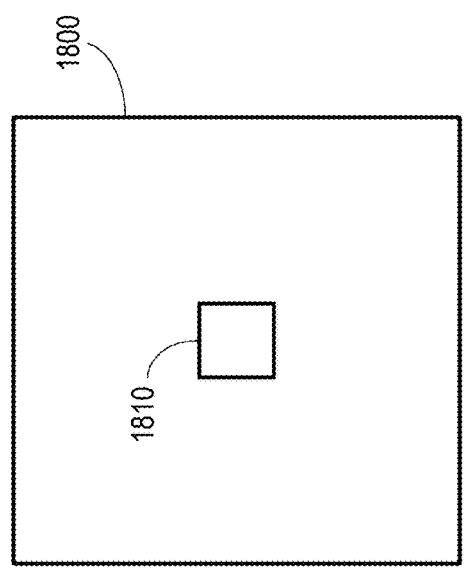
FIG. 18

US 10,572,970 B2

EXTRACTING 2D FLOOR PLAN FROM 3D GRID REPRESENTATION OF INTERIOR SPACE

CROSS REFERENCE TO RELATED APPLICATIONS

This application claims priority to U.S. Provisional Patent Application 62/491,988 entitled "Floor Plan Mapping and Simplification System Overview," which was filed on Apr. 28, 2017 and is incorporated herein by reference in its entirety.

BACKGROUND

A two-dimensional (2D) floor plan of a building, house, or apartment is a valuable representation of the corresponding structure. For example, the 2D floor plan is used to illustrate a room layout for a potential buyer of a home or building, a potential tenant of an apartment, an interior designer that is planning a redesign of the interior space, an architect involved in a renovation of the structure, and the like. Conventional processes of generating a 2D floor plan require human intervention, even though systems are available to scan the three-dimensional (3D) geometry of an interior space. For example, a draftsperson is typically required to draw a 2D architectural floor plan based on the scanned 3D geometry. Furthermore, commercially available systems for performing 3D scanning are relatively expensive and the scanning process is time and labor intensive. For example, a conventional 3D scanning system uses detectors mounted on a tripod, which must be moved to several acquisition locations within the structure that is being scanned. The scanning time at each acquisition location is typically several minutes or more. Mobile 3D scanning can be implemented by adding a depth camera to a mobile phone to capture the 3D geometry of a structure. However, this approach still requires manual extraction of the 2D floor plan from the 3D geometry. Consequently, up-to-date floor plans are not available for most buildings, houses, and apartments.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIGS. 2 and 3 illustrate example front and back plan views of an example implementation of the electronic device in a tablet form factor according to some embodiments.

FIG. 18 is a block diagram illustrating a tile and a set of overlapping tiles that are provided as input to a CNN according to some embodiments.

DETAILED DESCRIPTION

Figure 1:
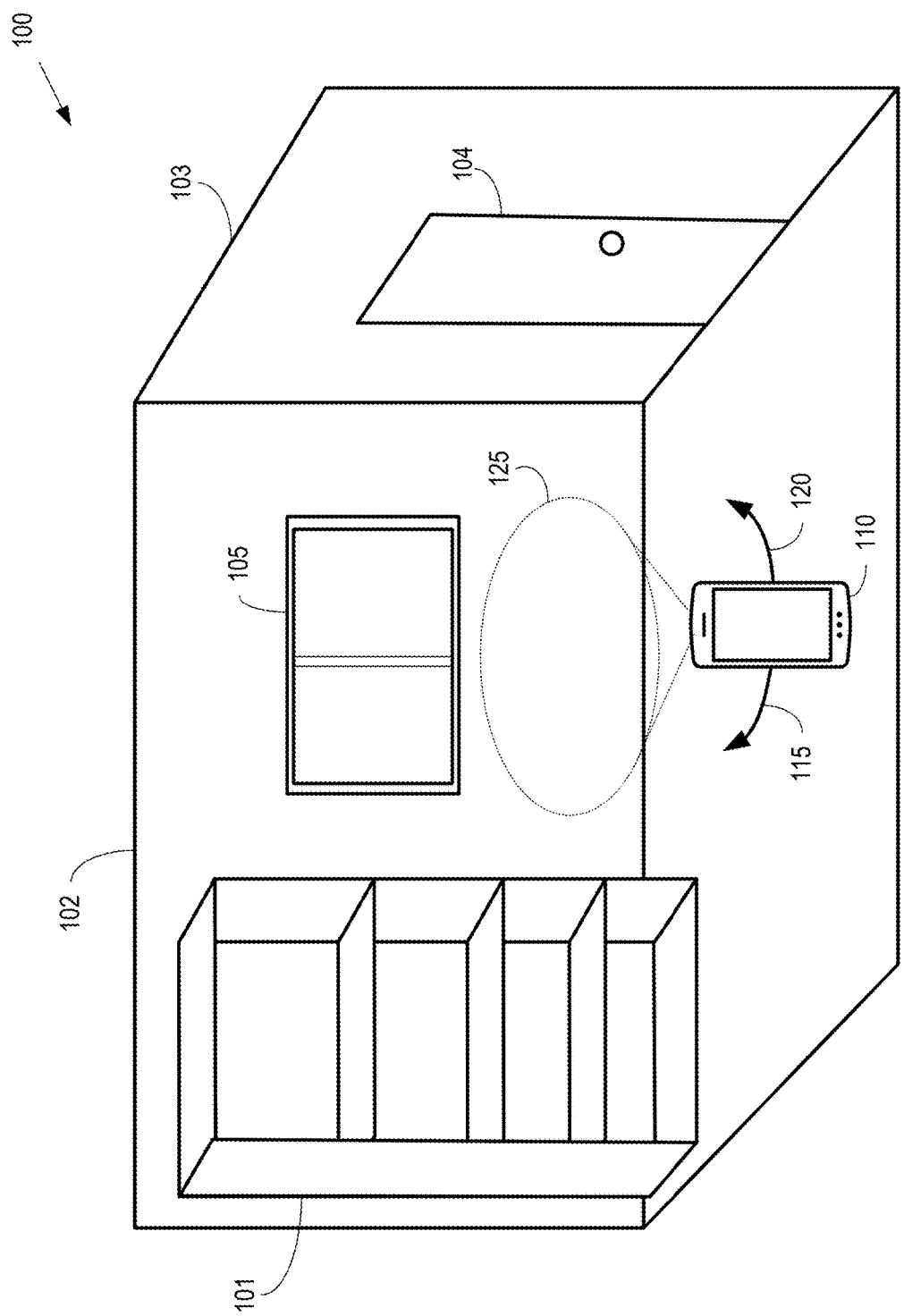
FIG. 1 is a diagram of an interior space and an electronic device that performs three-dimensional (3D) scanning of the interior space according to some embodiments.

A 2D floor plan of a structure is generated using a vertical projection of voxels in a 3D grid that represents a volume enclosed by the structure. In some embodiments, the 3D grid is acquired using a 3D scanning application in a mobile phone that implements a 2D camera and a depth camera. The voxels store information including their spatial position, the spatial extent of the voxel, the number of observations of the voxel (or weight of the information), and the estimated signed distance to the nearest surface to the voxel. A 3D mesh of triangles that represents the scanned volume is generated (or extracted) based on the values of the voxels. Vertical projection of voxels on to a 2D tile in the 2D floor plan includes summing weights of voxels along a vertical direction to determine a 2D weight for the tile and determining a weighted sum of the signed distances along the vertical direction to determine a 2D signed distance for the tile. In some embodiments, additional features are extracted from the 3D representation such as a height of the highest surface that is visible from above, a height of the lowest surface that is visible from below, a ratio of free space to occupied space in a vertical band, and the like. The 2D weights and the 2D signed distances of the tiles are used to generate 2D distance grids that represent features in the structure, such as walls, free space, furniture, doors, windows, and the like. In some cases, the 2D distance grids are converted into polygons that represent the features in the floor plan.

Real-time generation of the 2D floor plan is supported by subdividing the 3D grid into a set of volumes containing a predetermined number of voxels, e.g., a volume of 16×16× 16 voxels. The system identifies the volumes that are affected in response to acquisition of a new depth image of the structure. Only the values of the voxels in the affected volumes are updated and the corresponding 3D mesh is re-extracted. Subsets of the tiles in the 2D floor plan are associated with corresponding volumes that include voxels that are vertically projected onto the subset of tiles. The 2D floor plan is updated by determining whether one or more volumes in each vertical column associated with a subset of tiles has been updated. If so, a portion of the 2D floor plan that includes the subset of tiles is recomputed and corresponding polygons (or partial polygons) are extracted. Noise in the 2D floor plan is reduced by representing the floor plan as a series of primitives such as lines, rectangles, triangles, circles, polygons, and the like. The primitives are associated with semantic classes such as free space, walls, unknown, as well as other classes that can include furniture, doors, windows, and the like. The primitives can be oriented in any direction. An iterative process is used to find a sequence of primitives and corresponding orientations that approximate the 2D floor plan by minimizing a cost function over a set of primitives and orientations.

FIG. 1 is a diagram of an interior space 100 and an electronic device 110 that performs 3D scanning of the interior space 100 according to some embodiments. The interior space 100 encloses a volume that includes features such as furniture (e.g., the bookcase 101), walls 102, 103, a door 104, and a window 105. Some embodiments of the interior space 100 include additional rooms, other types of furniture and various other objects that are disposed within the interior space 100.

The electronic device 110 is configured to support location-based functionality, such as simultaneous localization and mapping (SLAM) or augmented reality (AR), using image and non-image sensor data in accordance with at least one embodiment of the present disclosure. The electronic device 110 can include a portable user device, such as a tablet computer, computing-enabled cellular phone (e.g., a "smartphone"), a notebook computer, a personal digital assistant (PDA), a gaming system remote, a television remote, an AR/VR headset, and the like. In other embodiments, the electronic device 110 includes a fixture device, such as a personal service robot such as a vacuum cleaning robot, medical imaging equipment, a security imaging camera system, an industrial robot control system, a drone control system, a 3D scanning apparatus, and the like. For ease of illustration, the electronic device 110 is generally described herein in the example context of a portable user device, such as a tablet computer or a smartphone; however, the electronic device 110 is not limited to these example implementations.

The electronic device 110 includes a plurality of sensors to obtain information regarding the interior space 100. The electronic device 110 obtains visual information (imagery) for the interior space 100 via imaging cameras and a depth sensor disposed at a forward-facing surface and, in some embodiments, an imaging camera disposed at a user-facing surface. As discussed herein, the imaging cameras and the depth sensor are used to perform 3D scanning of the environment of the interior space 100. In some embodiments, a user holding the electronic device 110 moves through the interior space 100, as indicated by the arrows 115, 120. The user orients the electronic device 110 so that the imaging cameras and the depth sensor are able to capture images and sense a depth of a portion of the interior space 100, as indicated by the dotted oval 125. The captured images and the corresponding depths are then stored by the electronic device 110 for later use in generating a 3D grid representation of the interior space 100 and a 2D floor plan of the interior space 100.

Some embodiments of the electronic device 110 rely on non-image information for position/orientation detection. This non-image information can be obtained by the electronic device 110 via one or more non-image sensors (not shown in FIG. 1), such as a gyroscope or ambient light sensor. The non-image sensors also can include user interface components, such as a keypad (e.g., touchscreen or keyboard), microphone, mouse, and the like. The non-image sensor information representing a state of the electronic device 110 at a given point in time is referred to as the "current context" of the electronic device for that point in time. This current context can include explicit context, such as the relative rotational orientation of the electronic device 110 or the ambient light from the local environment incident on the electronic device 110. For example, the current context can include a 6 degree-of-freedom (6DoF) pose of the electronic device 110 that indicates 3D coordinates of the electronic device 110 within the interior space 100 and rotational coordinates of the electronic device 110 such as a pitch, roll, and yaw. The current context also can include implicit context information, such as information inferred from calendar information or clock information, or information inferred from a user's interactions with the electronic device 110.

In operation, the electronic device 110 uses the image sensor data and the non-image sensor data to determine a relative position/orientation of the electronic device 110, that is, a position/orientation relative to the interior space 100. In at least one embodiment, the determination of the relative position/orientation is based on the detection of spatial features in image data captured by one or more of the imaging cameras and the determination of the position/ orientation of the electronic device 110 relative to the detected spatial features. Non-image sensor data, such as readings from a gyroscope, a magnetometer, an ambient light sensor, a keypad, a microphone, and the like, also is collected by the electronic device 110 in its current position/ orientation.

Some embodiments of the electronic device 110 combine the relative position/orientation of the electronic device 110, the pose of the electronic device 110, the image sensor data, and the depth sensor data to generate a 3D grid of voxels that represent the interior space 100 and features within the interior space 100 including the bookcase 101, the walls 102, 103, the door 104, and the window 105. Each voxel represents a portion of the volume enclosed by the interior space 100. The voxels include values of weights that indicate a number of observations that include the corresponding portion of the volume of the interior space 100 and signed distances relative to surfaces associated with the voxels.

The electronic device 110 is able to generate a 2D distance grid that represents the interior space 100 by vertically projecting the 3D grid into the plane of the floor of the interior space 100. In the illustrated embodiment, the 2D distance grid indicates locations of the bookcase 101 and the walls 102, 103 in the floor plan of the interior space 100. The 2D distance grid can also include information indicating locations of the door 104, the window 105, and other objects or features in the interior space 100. Some embodiments of the electronic device 110 generate the 2D distance grid concurrently with performing the 3D scan of the interior space 100, e.g., by accessing subsets of the voxels that were modified in a previous time interval while the electronic device 110 was performing the 3D scan. Noise in the 2D grid is reduced by representing the 2D floor plan of the interior space 100 as a set of primitives, such as lines, circles, triangles, rectangles, or other polygons. Some embodiments of the electronic device 110 are therefore able to iteratively select a primitive that minimizes a cost function when the primitive is added to the set of primitives that are used to represent the interior space 100. As discussed herein, the cost function indicates how well the set of primitives matches the 2D distance grid.

FIGS. 2 and 3 illustrate example front and back plan views of an example implementation of the electronic device 110 in a tablet form factor according to some embodiments. The electronic device 110 may be implemented in other form factors, such as a smart phone form factor, a medical imaging device form factor, and the like, which implement configurations analogous to those illustrated.

As illustrated by the front plan view 200 of FIG. 2, the electronic device 110 can include one or more user interface components, such as touch keys 202, 204, and 206 of a keypad disposed at a user-facing surface 208. The electronic device 110 also includes a display 210. Some embodiments of the display 210 are implemented as a touch screen display so as to facilitate user input and control via the user's interaction with the display 210. In the illustrated embodiment, the electronic device 110 further includes a user-facing imaging camera 212. The imaging camera 212 can be used to capture image data for the local environment facing the surface 208. Further, in some embodiments, the imaging camera 212 is configured for tracking the movements of the head or for facial recognition, and thus providing head tracking information that may be used to adjust a view perspective of imagery presented via the display 210.

As illustrated by the back plan view 300 of FIG. 3, the electronic device 110 includes a wide-view imaging camera 302, a narrow-view imaging camera 304, and a modulated light projector 306 disposed at a forward-facing surface 310.

In one embodiment, the imaging camera 302 is implemented as a wide-angle imaging camera having a fish-eye lens or other wide-angle lens to provide a wider angle view of the local environment facing the surface 310. The imaging camera 304 is implemented as a narrow-angle imaging camera having a typical angle of view lens to provide a narrower angle view of the local environment facing the surface 310. Accordingly, the imaging camera 302 and the imaging camera 304 are also referred to herein as the "wide-angle imaging camera 302" and the "narrow-angle imaging camera 304," respectively. As described in greater detail below, the wide-angle imaging camera 302 and the narrow-angle imaging camera 304 can be positioned and oriented on the forward-facing surface 310 such that their fields of view overlap starting at a specified distance from the electronic device 110, thereby enabling depth sensing of objects in the local environment that are positioned in the region of overlapping fields of view via multiview image analysis.

Some embodiments of a depth sensor implemented in the electronic device 110 uses the modulated light projector 306 to project modulated light patterns from the forward-facing surface 310 into the local environment, and uses one or both of imaging cameras 302, 304 to capture reflections of the modulated light patterns as they reflect back from objects in the local environment. These modulated light patterns can be either spatially-modulated light patterns or temporally-modulated light patterns. The captured reflections of the modulated light patterns are referred to herein as "depth imagery." The depth sensor calculates the depths of the objects, that is, the distances of the objects from the electronic device 110, based on the analysis of the depth imagery. The resulting depth data obtained from the depth sensor may be used to calibrate or otherwise augment depth information obtained from multiview analysis (e.g., stereoscopic analysis) of the image data captured by the imaging cameras 302, 304. Alternatively, the depth data from the depth sensor may be used in place of depth information obtained from multiview analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 110 senses that it is outdoors or otherwise in relatively good lighting conditions, the electronic device 110 may elect to use multiview analysis to determine object depths. Conversely, when the electronic device 110 senses that it is indoors or otherwise in relatively poor lighting conditions, the electronic device 110 may switch to using modulated light-based depth sensing via the depth sensor.

Figure 4:
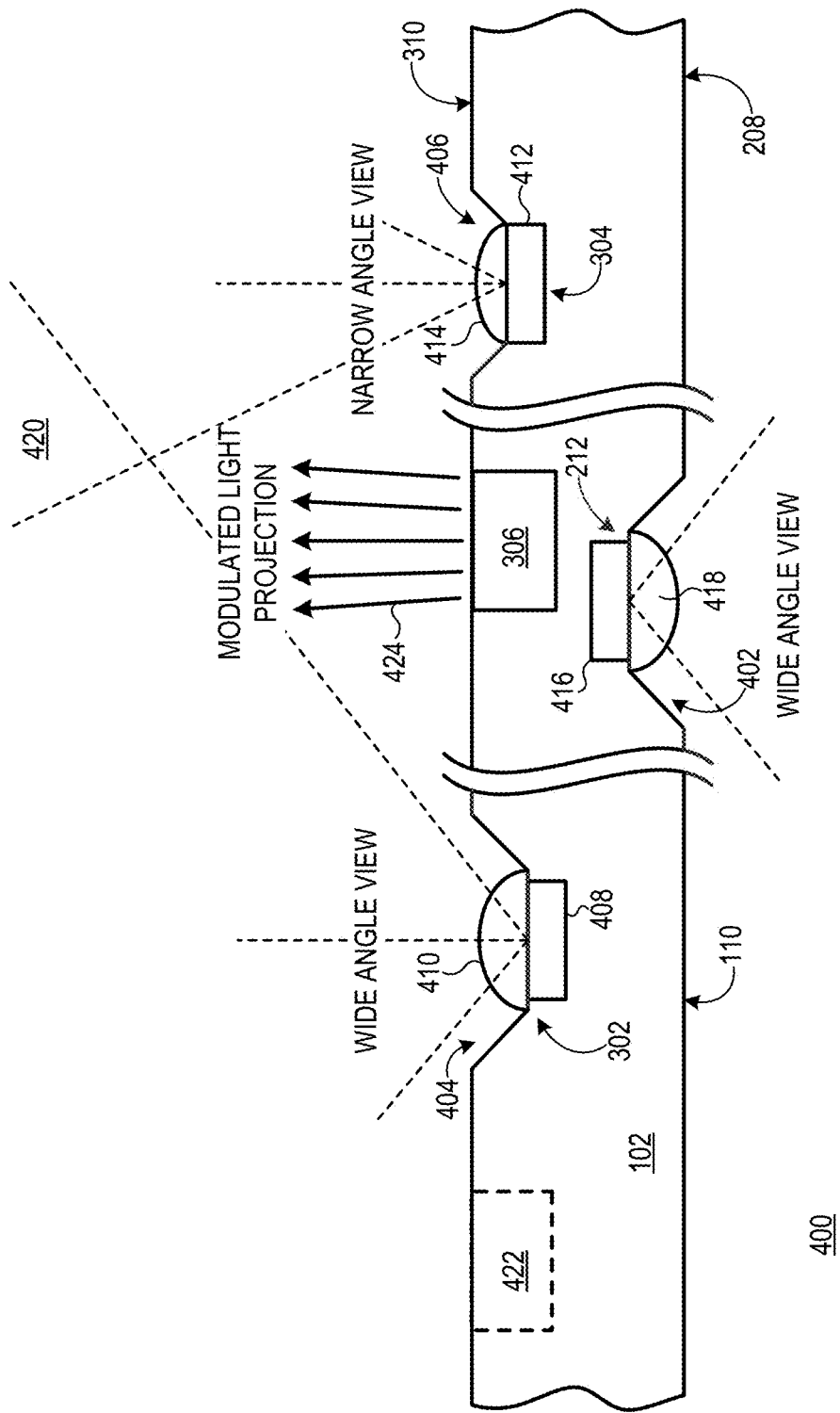
FIG. 4 illustrates an example cross-section view of the electronic device along a line depicted in the plan views of FIGS. 2 and 3 in accordance with at least one embodiment of the present disclosure.

Although FIGS. 2 and 3 illustrate the imaging cameras 212, 302, and 304 and the modulated light projector 306 aligned along a straight line for the benefit of an example cross-section view in FIG. 4, the imaging cameras 212, 302, and 304 and the modulated light projector 306 may be offset relative to each other. For example, the modulated light projector 306 may be positioned at an offset from a line extending between the imaging cameras 302 and 304, or the modulated light projector 306 and the wide-angle imaging camera 302 may be disposed along a line parallel to the top edge of the electronic device 110 and the narrow-angle imaging camera 304 may be disposed at a location offset from this line. Moreover, although the modulated light projector 306 is illustrated as positioned between the imaging cameras 302 and 304, in other implementations the modulated light projector 306 may be positioned to the outside of one of the imaging cameras 302 and 304.

FIG. 4 illustrates an example cross-section view 400 of the electronic device 110 along a line 215 depicted in the plan views of FIGS. 2 and 3 in accordance with at least one embodiment of the present disclosure. As illustrated, the electronic device 110 includes the user-facing imaging camera 212 disposed in an aperture 402 or other opening in the user-facing surface 208 and includes the wide-angle imaging camera 302 and the narrow-angle imaging camera 304 disposed in apertures 404 and 406, respectively, or other openings in the forward-facing surface 310. The wide-angle imaging camera 302 includes an image sensor 408 and one or more lenses 410 disposed over a sensing surface of the image sensor 408. The narrow-angle imaging camera 304 includes an image sensor 412 and one or more lenses 414 disposed over the sensing surface of the image sensor 412. Similarly, the user-facing imaging camera 212 includes an image sensor 416 and one or more lenses 418 disposed over the sensing surface of the image sensor 416.

The type of lens implemented for each imaging camera depends on the intended function of the imaging camera. Because the forward-facing imaging camera 302, in one embodiment, is intended for machine vision-specific imagery for analyzing the local environment, the lens 410 may be implemented as a wide-angle lens or a fish-eye lens having, for example, an angle of view between 160-180 degrees with a known high distortion. The forward-facing imaging camera 304, in one embodiment, supports user-initiated image capture, and thus the lens 414 of the forward-facing imaging camera 304 may be implemented as a narrow-angle lens having, for example, an angle of view between 80-90 degrees horizontally. Note that these angles of view are exemplary only. The user-facing imaging camera 212 likewise may have other uses in addition to supporting local environment imaging or head tracking. For example, the user-facing imaging camera 212 also may be used to support video conferencing functionality for the electronic device 110. Accordingly, depending on the application the lens 418 of the user-facing imaging camera 212 can be implemented as a narrow-angle lens, a wide-angle lens, or a fish-eye lens.

The image sensors 408, 412, and 416 of the imaging cameras 212, 302, and 304, respectively, can be implemented as charge coupled device (CCD)-based sensors, complementary metal-oxide-semiconductor (CMOS) active pixel sensors, and the like. In a CMOS-based implementation, the image sensor may include a rolling shutter sensor whereby a group of one or more rows of pixel sensors of the image sensor is read out while all other rows on the sensor continue to be exposed. This approach has the benefit of providing increased sensitivity due to the longer exposure times or more usable light sensitive area, but with the drawback of being subject to distortion due to high-speed objects being captured in the frame. The effect of distortion can be minimized by implementing a global reset mechanism in the rolling shutter so that all of the pixels on the sensor begin collecting charge simultaneously, rather than on a row-by-row basis. In a CCD-based implementation, the image sensor can be implemented as a global shutter sensor whereby all pixels of the sensor are exposed at the same time and then transferred to a shielded area that can then be read out while the next image frame is being exposed. This approach has the benefit of being less susceptible to distortion, with the downside of generally decreased sensitivity due to the additional electronics required per pixel.

In some embodiments the fields of view of the wide-angle imaging camera 302 and the narrow-angle imaging camera 304 overlap in a region 420 so that objects in the local environment in the region 420 are represented both in the image frame captured by the wide-angle imaging camera 302 and in the image frame concurrently captured by the narrow-angle imaging camera 304, thereby allowing the depth of the objects in the region 420 to be determined by the electronic device 110 through a multiview analysis of the two concurrent image frames. As such, the forward-facing imaging cameras 302 and 304 are positioned at the forward-facing surface 310 so that the region 420 covers an intended distance range and sweep relative to the electronic device 110. Moreover, as the multiview analysis relies on the parallax phenomena, the forward-facing imaging cameras 302 and 304 are sufficiently separated to provide adequate parallax for the multiview analysis.

Also illustrated in the cross-section view 400 are various example positions of the modulated light projector 306. The modulated light projector 306 projects an infrared modulated light pattern 424 in a direction generally perpendicular to the surface 310, and one or both of the forward-facing imaging cameras 302 and 304 are utilized to capture reflection of the projected light pattern 424. In the depicted example, the modulated light projector 306 is disposed at the forward-facing surface 310 at a location between the imaging cameras 302 and 304. In other embodiments, the modulated light projector 306 can be disposed at a location between one of the imaging cameras and an edge of a housing, such as at a location 422 between the wide-angle imaging camera 302 and the side of the housing, or at a location (not shown) between the narrow-angle imaging camera 304 and the side of the housing.

Figure 5:
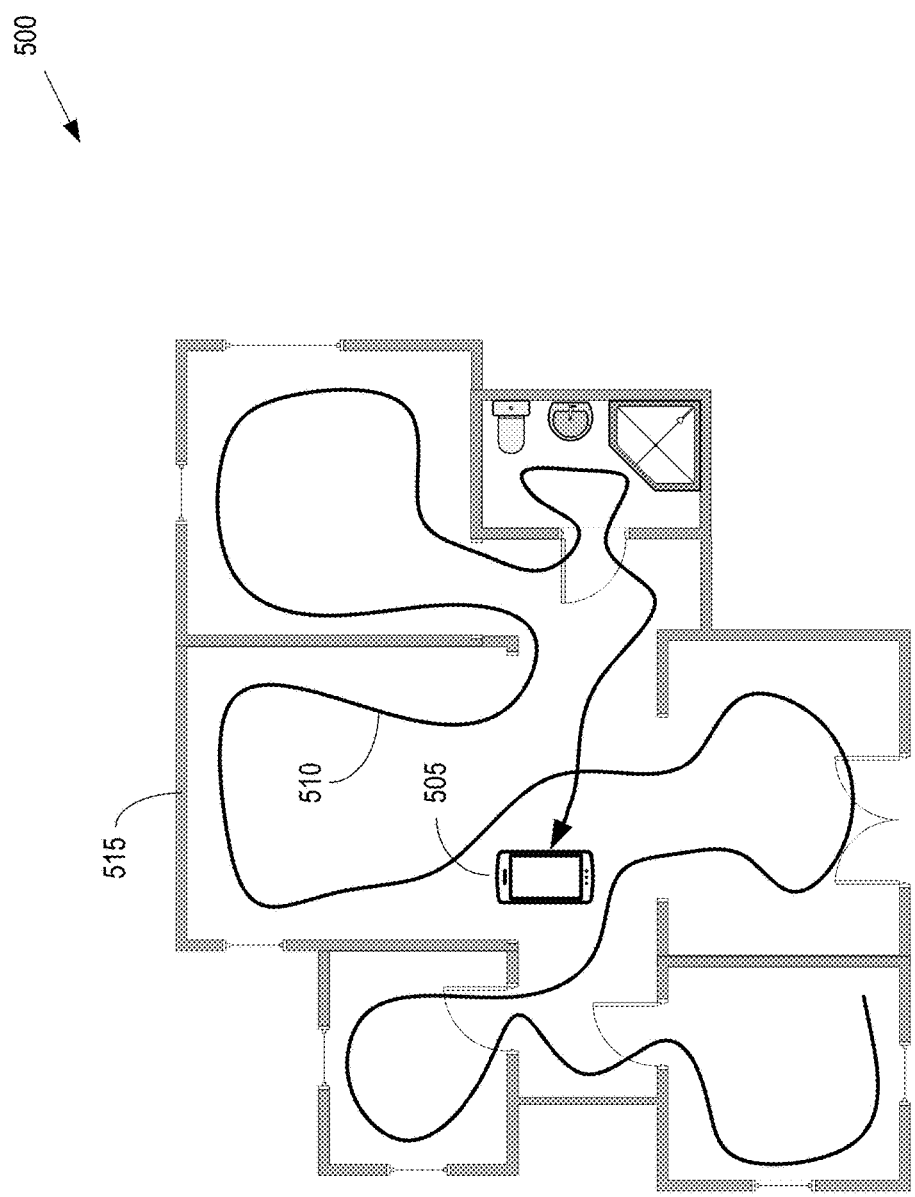
FIG. 5 illustrates a top-down view of an interior space of a building such as an apartment or house according to some embodiments.

FIG. 5 illustrates a top-down view 500 of an interior space of a building such as an apartment or house according to some embodiments. Some embodiments of the interior space 100 shown in FIG. 1 correspond to a portion of the top-down view 500. A user holding a user equipment 505 moves along a path 510 through the interior space. The user equipment 505 is implemented using some embodiments of the electronic device 110 shown in FIGS. 1, 2, and 3. As the user moves along the path 510, the user points the user equipment 505 at various features of the interior space such as walls 515 (only one indicated by a reference numeral in the interest of clarity), furniture (not shown in FIG. 5 in the interest of clarity), or other features within the interior space.

The user equipment 505 generates a 3D grid representative of the interior space using images and depth values gathered during the 3D scan of the interior space. Some embodiments of the user equipment generate a 3D truncated signed distance function (TSDF) grid to represent the interior space. For example, the user equipment 505 can estimate camera poses in real-time using visual-inertial odometry (VIO) or concurrent odometry and mapping (COM). Depth images are then used to build the 3D volumetric TSDF grid that represents features of the interior space. Techniques for generating 3D TSDF grids are known in the art and in the interest of clarity are not discussed further herein. In some embodiments, the 3D TSDF grid is updated in response to each depth image that is acquired by the user equipment 505. Alternatively, the 3D TSDF grid is updated in response to acquiring a predetermined number of depth images or in response to a predetermined time interval elapsing. A 3D triangle mesh is extracted from the 3D TSDF grid, e.g., using a marching cubes algorithm.

The 3D TSDF grid is composed of equally sized voxels having a particular side length, e.g., 2 centimeters (cm). Each voxel stores two values: the number of observations (weight) acquired by the user equipment 505 that include the volume represented by the voxel and an estimated signed distance to a corresponding surface, such as a surface of the wall 515. A 2D distance grid is generated from the 3D TSDF grid by projecting the voxels in a vertical direction. In some embodiments, the vertical projection is done by averaging the weights and the signed distances in a vertical direction. For example, the vertical averages can be computed as:

$$weight_{2d}(x, y) = \sum_{z} weight_{3d}(x, y, z) \qquad (1)$$

$$distance_{2d}(x, y) = \sum_{z} \frac{weight_{3d}(x, y, z)}{weight_{2d}(x, y)} \times distance_{3d}(x, y, z) \qquad (2)$$

In this example, the 2D floor plan is in the x-y plane and the vertical projection is along the z-direction. The 2D signed distance is normalized by dividing the 3D weights extracted from the 3D TSDF grid by the 2D weight in the illustrated embodiment.

Some embodiments of the user equipment 505 are configured to extract other features from the 3D TSDF grid. For example, the user equipment 505 can extract a value of a height of the highest surface that was visible from above:

$$\text{surface}_{\text{from above}}(x,y) = \max\{z | \text{distance}_{3d}(x,y,z) > 0 \text{ \&\& } \text{distance}_{3d}(x,y,z-1) < 0\} \quad (3)$$

Other features that can be extracted include a height of a lowest surface that is viewed from below, a ratio of free space to occupied space in a vertical band, and the like. The ratio of free/occupied space can be used to distinguish walls from windows, doors, and other openings.

Figure 6:
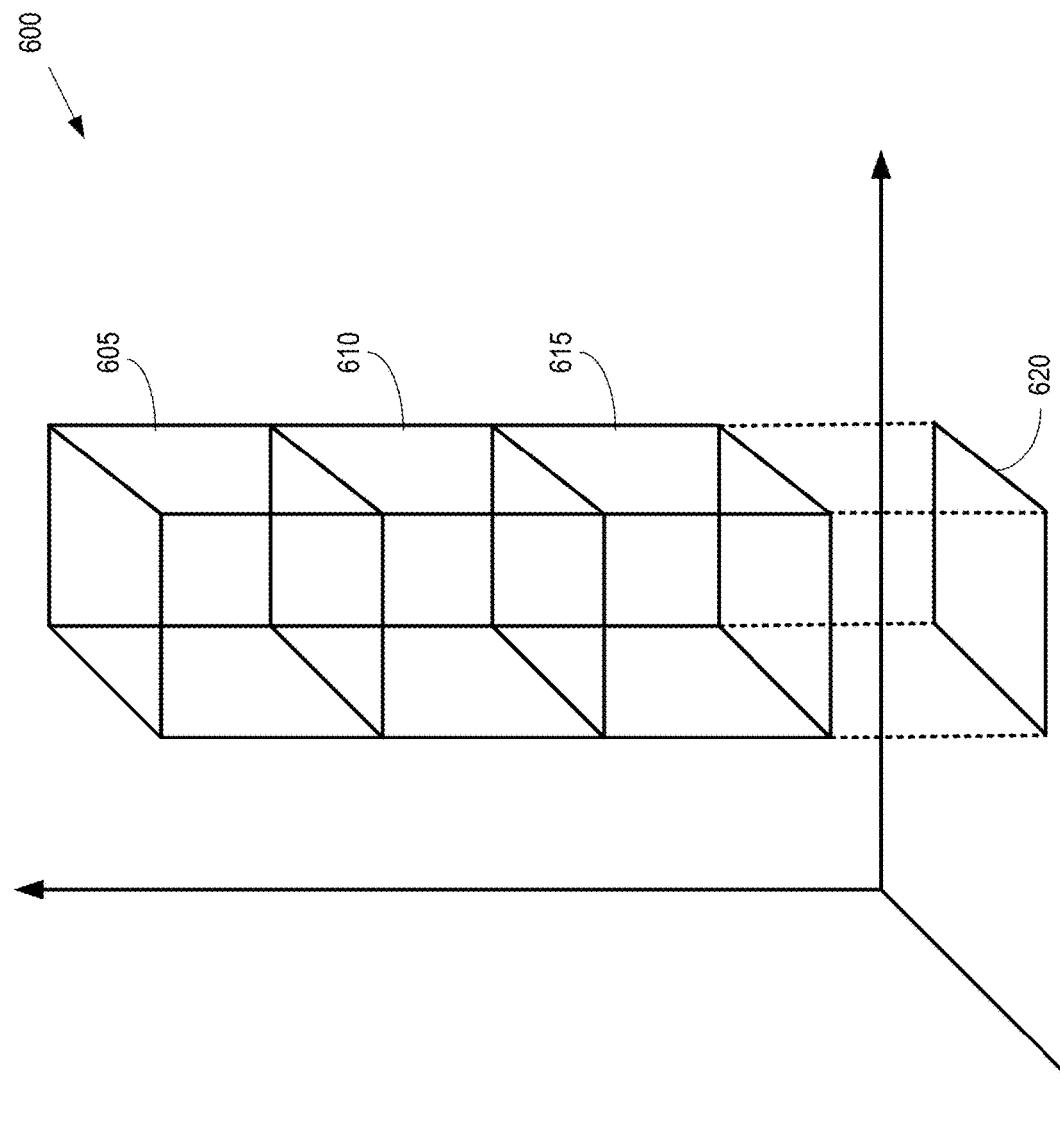
FIG. 6 is a block diagram of a portion of a 3D grid that is representative of an interior space according to some embodiments.

FIG. 6 is a block diagram of a portion 600 of a 3D grid that is representative of an interior space according to some embodiments. The portion 600 is representative of some embodiments of the interior space 100 shown in FIG. 1. The portion 600 includes voxels 605, 610, 615 that are arranged in a vertical column above a tile 620 in a plane of a floor plan of the interior space. As discussed herein, the voxels 605, 610, 615 are associated with corresponding values that represent characteristics of the interior space such as weights and signed distances. The voxels 605, 610, 615 are vertically projected onto the tile 620 by averaging or summing the values of the voxels 605, 610, 615. The tile 620 is then represented by average or summed values such as a 2D weight and a 2D signed distance. The tile 620 is used in combination with other tiles (not shown in FIG. 6) to generate 2D distance grids. In some embodiments, separate 2D distance grids are defined for different semantic classes of objects. For example, three 2D distance grids can be generated to encode walls, free space, and furniture.

Figure 7:
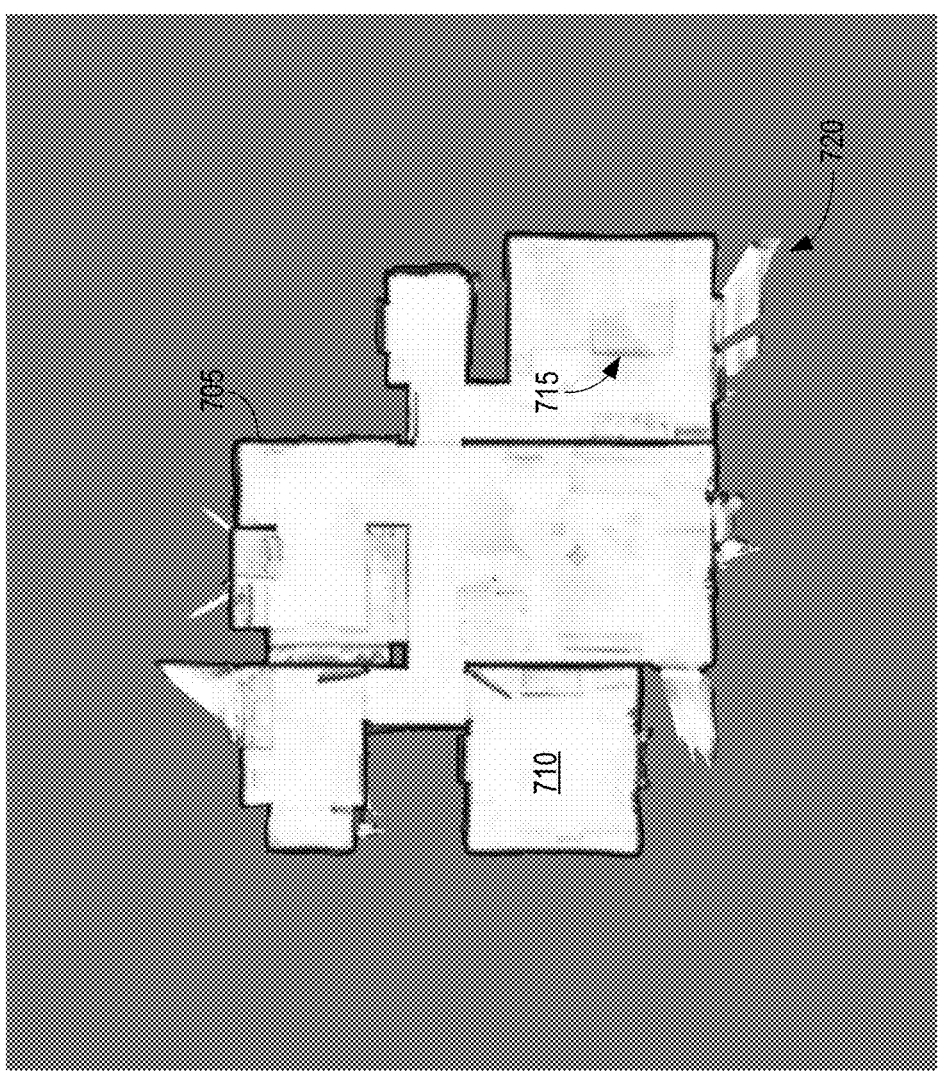
FIG. 7 is a two-dimensional (2D) distance grid that represents walls, free space, and furniture within an interior space according to some embodiments.

FIG. 7 is a 2D distance grid 700 that represents walls, free space, and furniture within an interior space according to some embodiments. The 2D distance grid 700 is generated by vertically projecting voxels from a 3D grid into a plane of a floor plan of the interior space. The illustrated embodiment of the 2D distance grid 700 is represented as a 2D TSDF grid. The colors of the pixels are determined based on estimated signed distances relative to surfaces that define the interior space. Black pixels represent the maximum negative truncation boundary, which corresponds to pixels that are inside of an object or a wall. Grey pixels are pixels that are at the boundary between regions that are inside and outside of a surface. In the illustrated embodiment, grey pixels are also the default value that is applied when the estimated signed distance is not known. White pixels are the maximum positive truncation distance, which corresponds to pixels that are outside of an object or a wall, e.g., pixels that are in free space.

Pixels in the 2D distance grid 700 are categorized in different semantic classes. In the illustrated embodiment, the semantic classes are walls, free space, and furniture. For example, pixels that represent walls 705 (only one indicated by a reference numeral in the interest of clarity) are encoded in black, pixels that represent free space 710 are encoded in white, and pixels that represent furniture 715 are encoded using grey. The 2D distance grid 700 is relatively noisy and includes artifacts, such as the region 720 that is produced by images and depths acquired from objects that are outside of a window. Thus, in some embodiments, the 2D distance grid 700 is converted into a set of polygons by extracting a zero iso-surface, for example, using the marching squares algorithm. The set of polygons generated using the marching squares algorithm is referred to as a raw version of a polygonised floor plan that represents the interior space.

Figure 8:
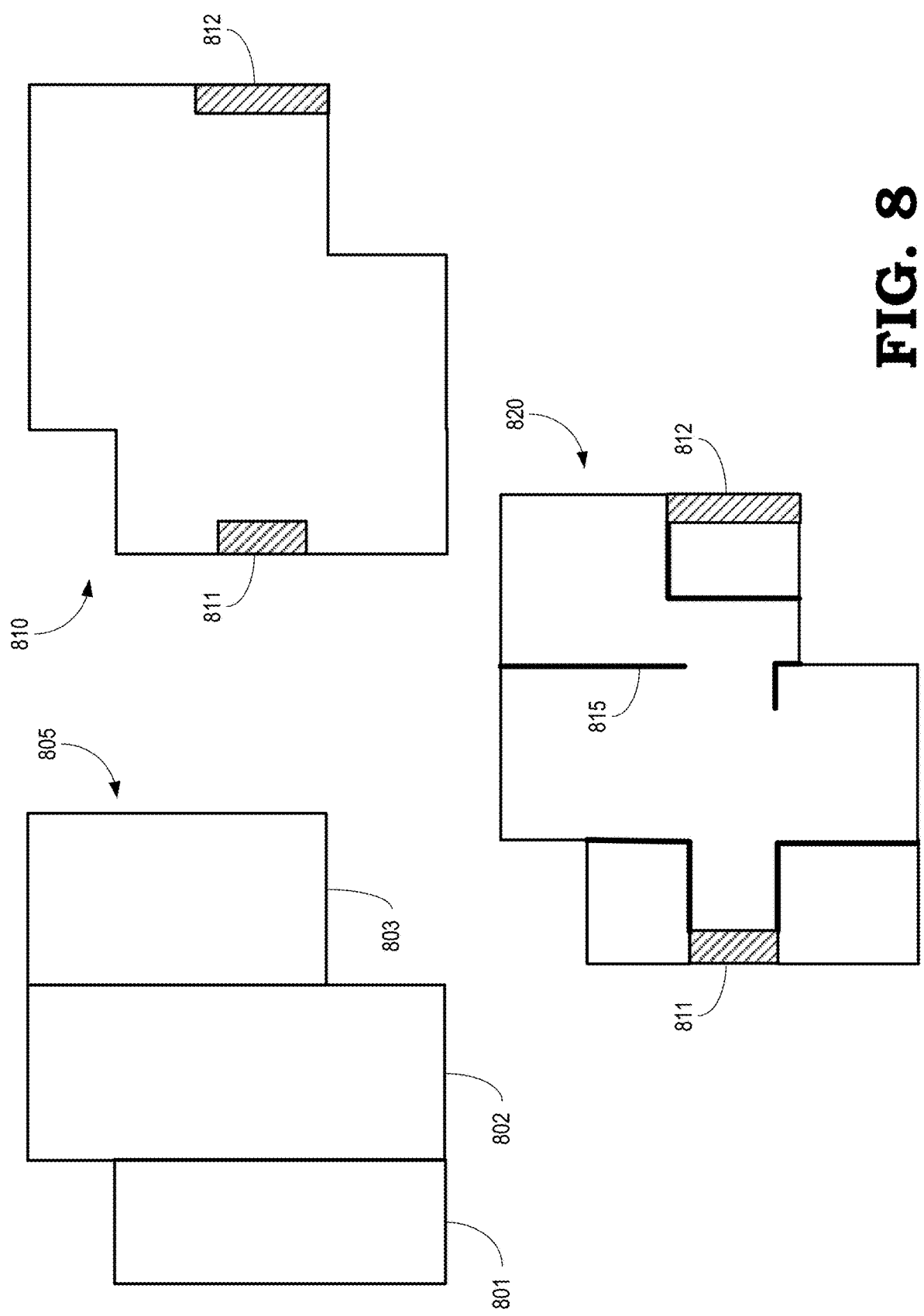
FIG. 8 illustrates a method of generating a set of polygons that represent a floor plan of an interior space according to some embodiments.

FIG. 8 illustrates a method of generating a set of polygons that represent a floor plan of an interior space according to some embodiments. The set of polygons is generated based on a 2D distance grid that has been generated by the user equipment 505 as it performs a 3D scan of the interior space shown in FIG. 5. The method iteratively selects one polygon at a time by determining the polygon that minimizes a cost function that indicates how well polygon matches the 2D distance grid when combined with any previously selected polygons. In the illustrated embodiment, the polygons are rectangles. However, in other embodiments, primitives including lines, triangles, circles, or other polygons are used to represent portions of the floor plan of the interior space.

The method shown in FIG. 8 first generates a target label image based on the 2D distance grid. Pixels in the target label image are assigned to one of a set of semantic classes. In the illustrated embodiment, pixels are assigned to one of three semantic classes: free space, wall, and unknown. However, in other embodiments, pixels are assigned to more or fewer semantic classes including furniture, appliances, windows, doors, and the like. The goal of the method is to find a sequence of primitives (rectangles, in this case) of the semantic classes that best approximates the input floor plan. The sequence is represented as:

$$P = \langle p_1, p_2, \ldots, p_N \rangle \quad (4)$$

The primitives are represented as:

$$p_i = (x_i, y_i, \varphi_i, \text{width}_i, \text{height}_i, \text{class}_i) \quad (5)$$

where (x, y) are coordinates of a reference point on the primitive in the plane of the floor plan, $\varphi$ is the orientation of the primitive in the plane, width is the width of the rectangular primitive, height is the height of the rectangular primitive, and class is the class of the primitive. Different sets of parameters are used to characterize other types of primitives.

The search space is reduced along possible orientations by determining a set of primary orientations of the floor plan. In some embodiments, as discussed below, a histogram is constructed to accumulate weighted gradient orientations from the 2D TSDF distance grid. Maxima in the histogram that are larger than a predetermined percentage of the global maximum are selected as primary orientations. In the embodiment shown in FIG. 8, the primary orientation is vertical or, equivalently, horizontal in the plane of the drawing. The search space over the (x, y) coordinates, the width, and the height of the rectangular primitives is quadratic and the number of pixels in the image. The complexity of the search is therefore:

$$O(n^2 * N_{orientations} * N_{classes}) \quad (6)$$

where n is the number of pixels $N_{orientations}$ is a number of possible orientations, and $N_{classes}$ is the number of possible classes. A predicted label image is generated by rasterize in the primitives in order.

The sequence of primitives is selected so that the predicted image generated by the sequence best matches the target label image. This criterion is represented as:

$$P_{best} = \text{argmax}_P \Sigma_{(x,y)} \text{cost}(\text{predicted}(P,x,y), \text{target}(x,y)) \quad (7)$$

where the cost function indicates how well the predicted image matches the target label image. The cost function is also used to assign weights to different semantic classes. For example, a higher cost can be assigned to missing walls than the cost that is assigned to missing free space. In practice, finding the optimal sequence of unknown length is an NP-hard problem. Some embodiments of the method therefore utilize an iterative algorithm that searches for a single primitive that minimizes the cost function at each iteration of the method.

A cost map is precomputed for every primitive and orientation over the full space of possible primitives. To evaluate the cost of adding a primitive to the set of primitives that represents the interior space at each iteration, a cost function is computed by iterating over pixels of the primitive. The cost function is represented as:

$$\mathrm{cost}(p) = \Sigma_{(x,y) \in P} \mathrm{cost}(\mathrm{predicted}(P,x,y), \mathrm{target}(x,y)) \qquad (8)$$

The cost maps are converted into integral images, which are also known as summed area tables. Techniques for computing summed area tables are known in the art and are therefore not discussed in detail herein. Utilizing integral images or summed area tables allows the cost to be determined in constant time, e.g., using four lookups to the summed area tables. Some embodiments of the cost function include a cost term for matching or mismatching pixels, as described above, a cost term for label changes to discourage combining large overlapping rectangles or other primitives, a cost term for vertices to discourage including walls that are within other walls or having parallel walls that touch each other. The cost term for vertices enhances the ability of the algorithm to distinguish between horizontal walls, vertical walls, and walls having other orientations to avoid including walls that have the same orientation. Parameters that characterize the cost functions are determined empirically.

At each iteration, the method evaluates all possible primitives and selects the primitive that has the lowest cost. The algorithm converges after the difference in cost from one iteration to the next falls below a predetermined threshold.

In the illustrated embodiment, the set 805 of polygons that represent the interior space includes three polygons 801, 802, 803 after a third iteration is complete. The polygons 801, 802, 803 are in the free space class, as indicated by the white fill. After the fifth iteration, the set 810 of polygons that represent the interior space includes two additional polygons 811, 812 that are both in the unknown class, as indicated by the crosshatching. After several more iterations, the algorithm has added polygons 815 (only one indicated by a reference numeral in the interest of clarity) to the set 820 of polygons. The polygons 815 represent walls in the interior space, as indicated by the black fill. The method continues until a convergence criterion is satisfied.

Figure 9:
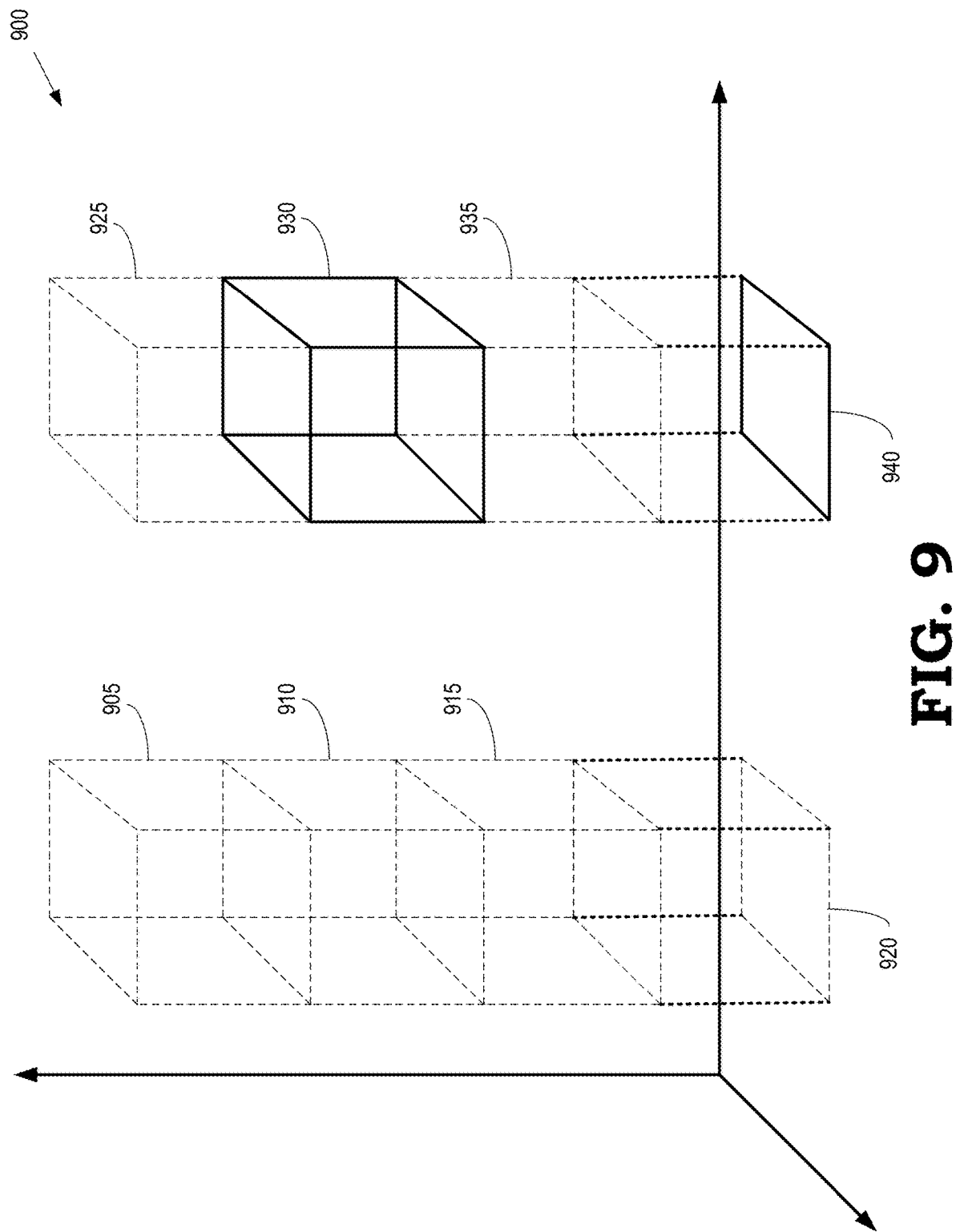
FIG. 9 is a block diagram of a portion of a 3D grid that is representative of an interior space according to some embodiments.

FIG. 9 is a block diagram of a portion 900 of a 3D grid that is representative of an interior space according to some embodiments. The portion 900 is representative of some embodiments of the interior space 100 shown in FIG. 1. The portion 900 includes voxels 905, 910, 915 that are arranged in a vertical column above a tile 920 in a plane of a floor plan of the interior space and voxels 925, 930, 935 that are arranged in a vertical column above a tile 940 in the plane of the floor plan. As discussed herein, the voxels 905, 910, 915, 925, 930, 935 are associated with corresponding values that represent characteristics of the interior space such as weights and signed distances. The different lines that represent the voxels 905, 910, 915, 925, 930, 935 indicate whether values for the corresponding voxel were or were not modified during a previous time interval of a 3D scanning process. In the illustrated embodiment, the light dashed lines indicate that the voxels 905, 910, 915, 925, 935 were not modified during the previous time interval of the 3D scanning process. The solid lines indicate that the voxel 930 was modified during the previous time interval.

The tiles 920, 940 are selectively updated depending upon whether the corresponding voxels 905, 910, 915, 925, 930, 935 were updated during the previous time interval of the 3D scan. In the illustrated embodiment, the tile 920 is not updated (as indicated by the light dashed lines) because none of the voxels 905, 910, 915 were modified during the previous time interval. The tile 940 is updated (as indicated by the solid line) because the values of the voxel 930 were modified during the previous time interval. The voxels 925, 930, 935 are therefore vertically projected onto the tile 940 by averaging or summing the values of the voxels 925, 930, 935 to update the values of the tile 940. Selectively updating the values of the tiles 920, 940 based on whether the corresponding voxels 905, 910, 915, 925, 930, 935 were previously updated allow some embodiments of the techniques for generating 2D floor plans disclosed herein to be performed in real-time.

In some embodiments, the voxels 905, 910, 915, 925, 930, 935 are grouped into volumes that include predetermined numbers of voxels. For example, a volume can include a 16×16×16 set of voxels that include one or more of the voxels 905, 910, 915, 925, 930, 935. In that case, the tiles are grouped into a corresponding set of tiles, e.g., 16×16 sets of tiles that are associated vertical columns of volumes including 16×16×16 sets of voxels. The sets of tiles are selectively updated based upon whether at least one voxel within the corresponding vertical column of volumes was or was not updated during a previous time interval of the 3D scan. Hashing is used in some embodiments to identify the volumes that include voxels that have been updated, e.g., by marking the corresponding volume as a "dirty" volume.

Figure 10:
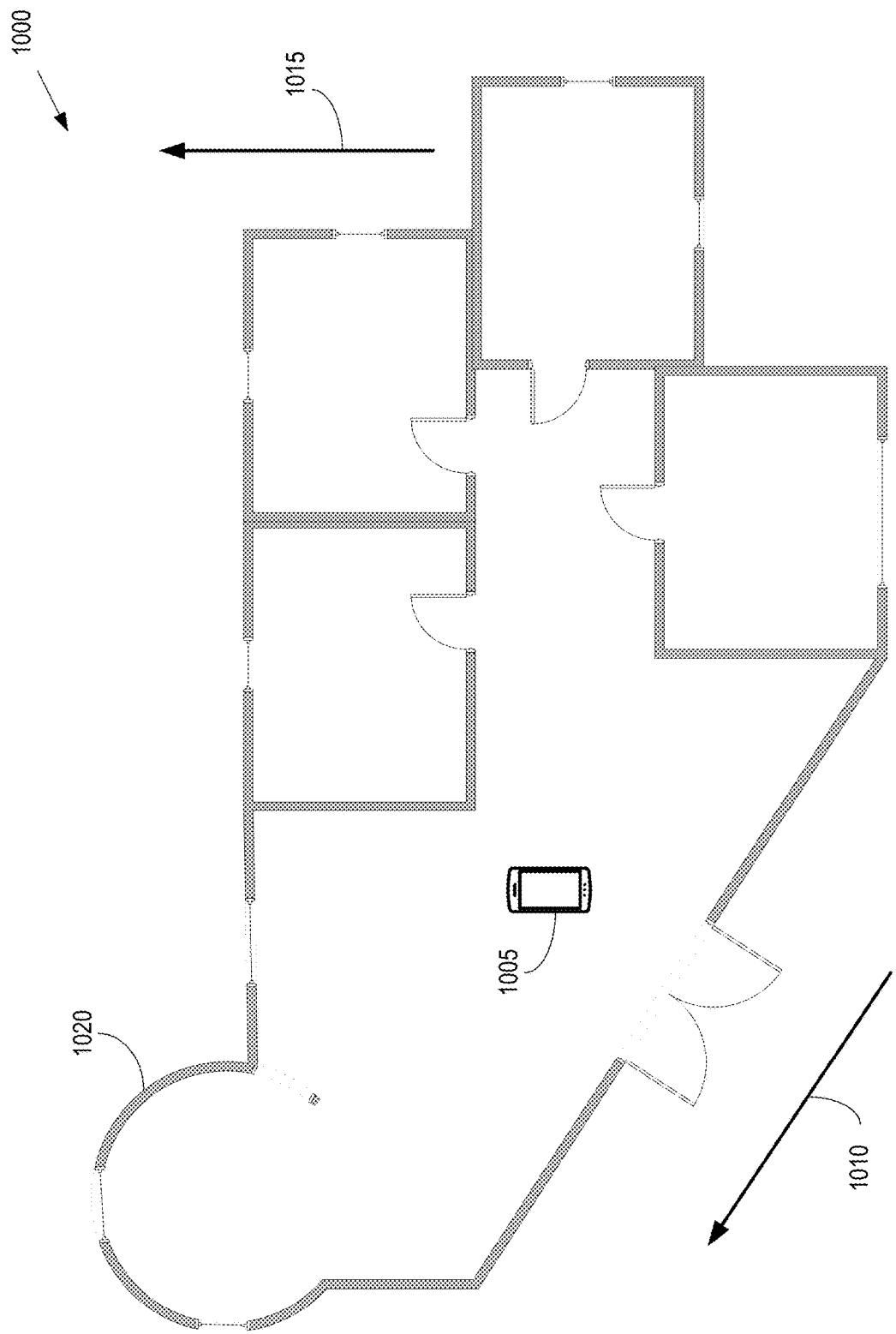
FIG. 10 illustrates a top-down view of an interior space that includes multiple primary orientations according to some embodiments.

FIG. 10 illustrates a top-down view 1000 of an interior space that includes multiple primary orientations according to some embodiments. A user holding user equipment 1005 performs a 3D scan while moving through the interior space and pointing an imaging camera and depth sensor at various features within the interior space, as discussed herein. The top-down view 1000 differs from the top-down view 500 shown in FIG. 5 in several respects. For example, the top-down view 1000 includes multiple primary orientations, as indicated by the arrows 1010, 1015. For another example, the top-down view 1000 includes portions that are more accurately represented by polygons other than rectangles, such as the portion 1020 that can be represented by a circular primitive.

Figure 11:
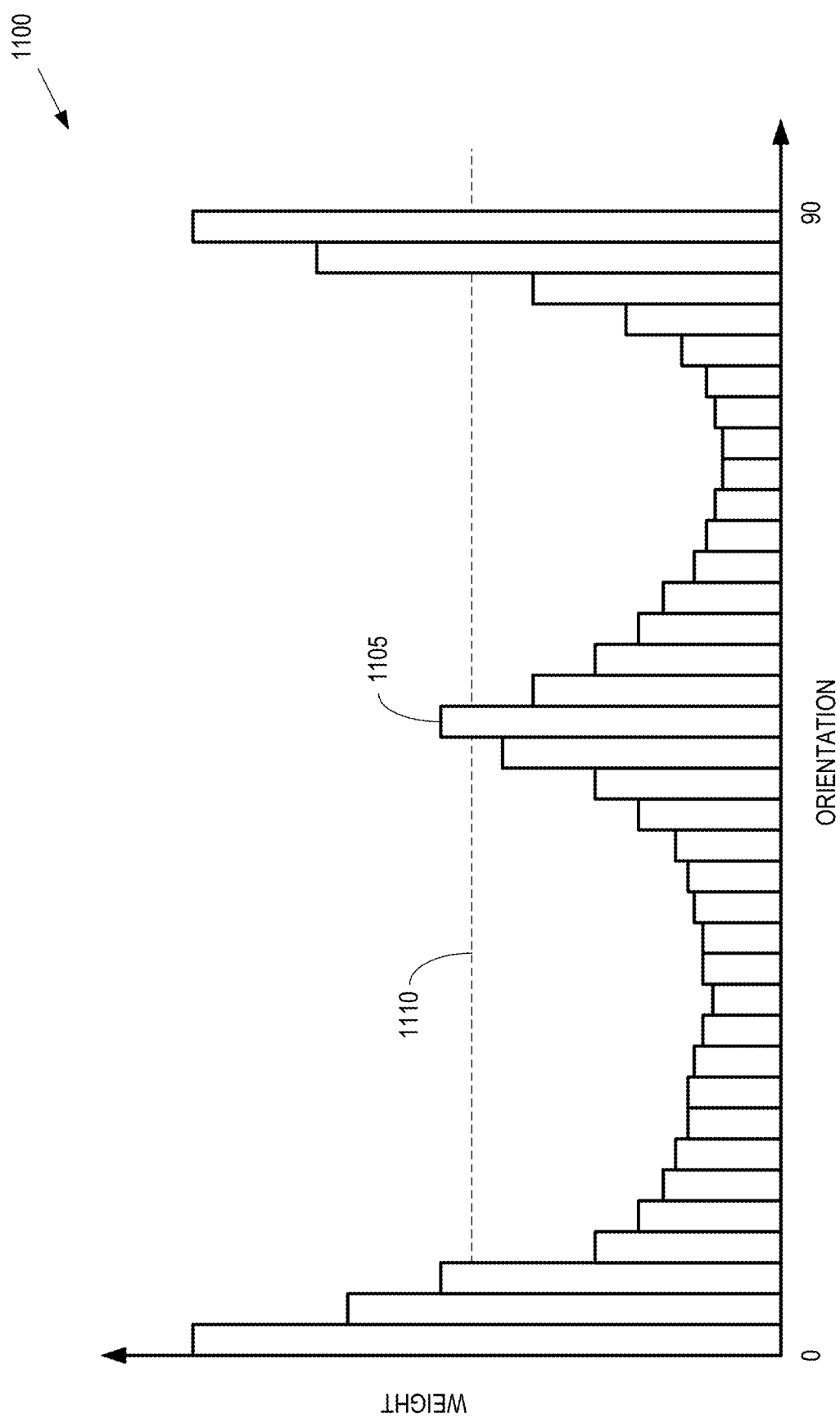
FIG. 11 is a histogram of weights corresponding to different orientations of 2D distance grid according to some embodiments.

FIG. 11 is a histogram 1100 of weights corresponding to different orientations of 2D distance grid according to some embodiments. The histogram 1100 is used to determine primary orientations for some embodiments of the top-down view 500 of the interior space shown in FIG. 5 and the top-down view 1000 of the interior space shown in FIG. 10. The vertical axis indicates a weight in arbitrary coordinates and the horizontal axis indicates an orientation in degrees ranging from 0° to 90°.

The weight associated with a pixel is determined by estimating a direction of a gradient in values of pixels. For example, a gradient of a pixel near a surface of a wall is approximately perpendicular to the wall because values of pixels within the wall (e.g. black pixels in a 2D TSDF grid) differ from values of pixels in the free space outside the wall (e.g., white pixels in a 2D TSDF grid). The weighted gradient orientations from the 2D TSDF distance grid are accumulated in bins 1105 (only one indicated by a reference numeral in the interest of clarity) corresponding to different orientations. Maxima in the histogram that are larger than a predetermined percentage of the global maximum are selected as primary orientations. The predetermined percentage is indicated by the line 1115 in FIG. 11. In the illustrated embodiment, which corresponds to the top-down view 1000 of the interior space shown in FIG. 10, the histogram 1100 indicates that the interior space has two primary orientations, one near 0°/90° and one near 45°.

Figure 12:
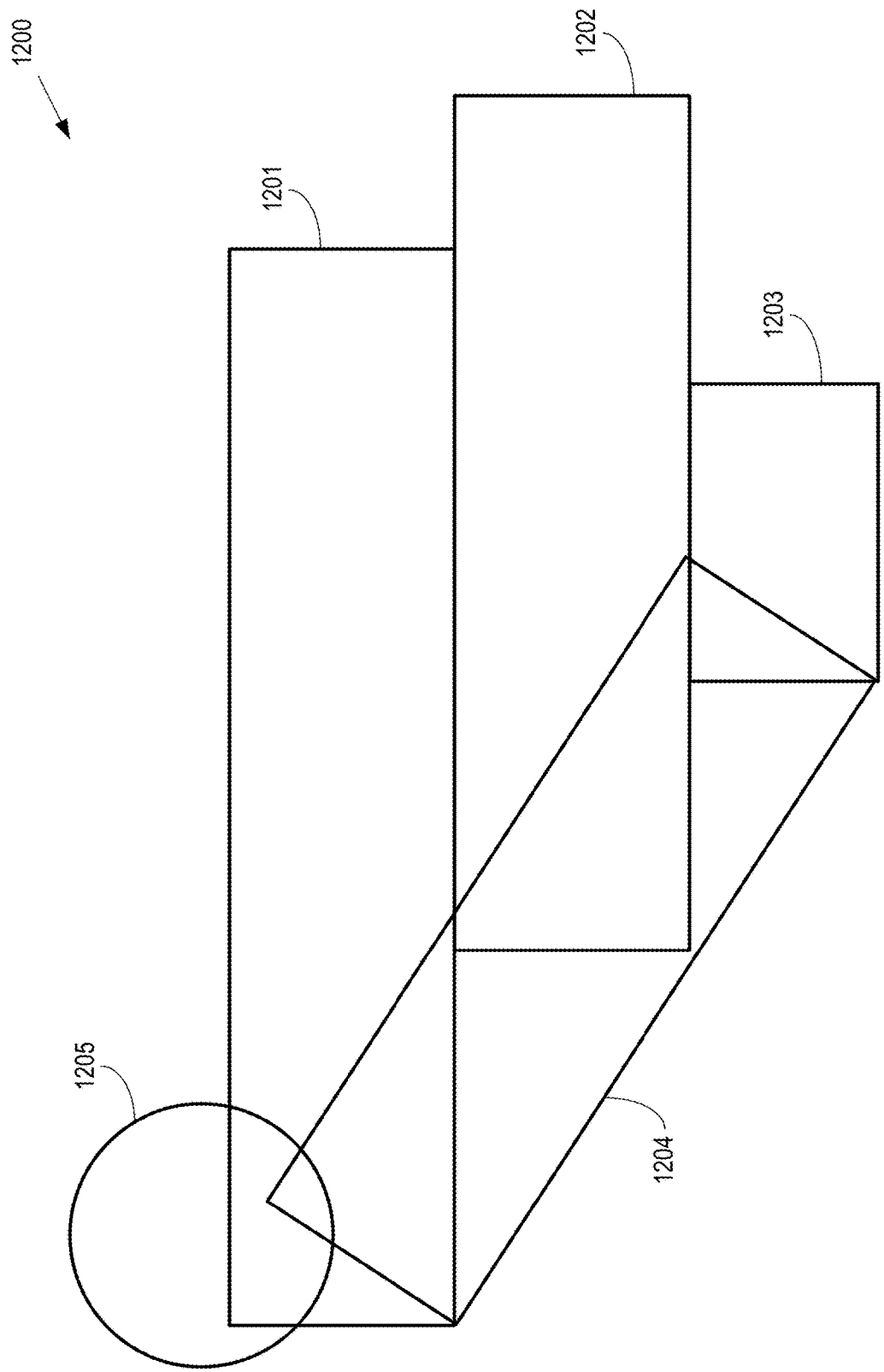
FIG. 12 illustrates a set of primitives that are generated based on a 2D distance grid of an interior space having multiple primary orientations according to some embodiments.

FIG. 12 illustrates a set 1200 of primitives that are generated based on a 2D distance grid of an interior space having multiple primary orientations according to some embodiments. The primary orientations are determined using a histogram such as some embodiments of the histogram 1100 shown in FIG. 11. The set 1200 represents some embodiments of the top-down view 1000 of the interior space shown in FIG. 10 after five iterations of the algorithm for selecting the set 1200 based on a cost function, as discussed herein. The set 1200 includes rectangular polygons 1201, 1202, 1203 having a first primary orientation near 0° and rectangular polygon 1204 having a second primary orientation near 45°. The set 1200 also includes a circular primitive 1205 to represent a corresponding portion 1020 in the top-down view 1000 of the interior space shown in FIG. 10.

Figure 13:
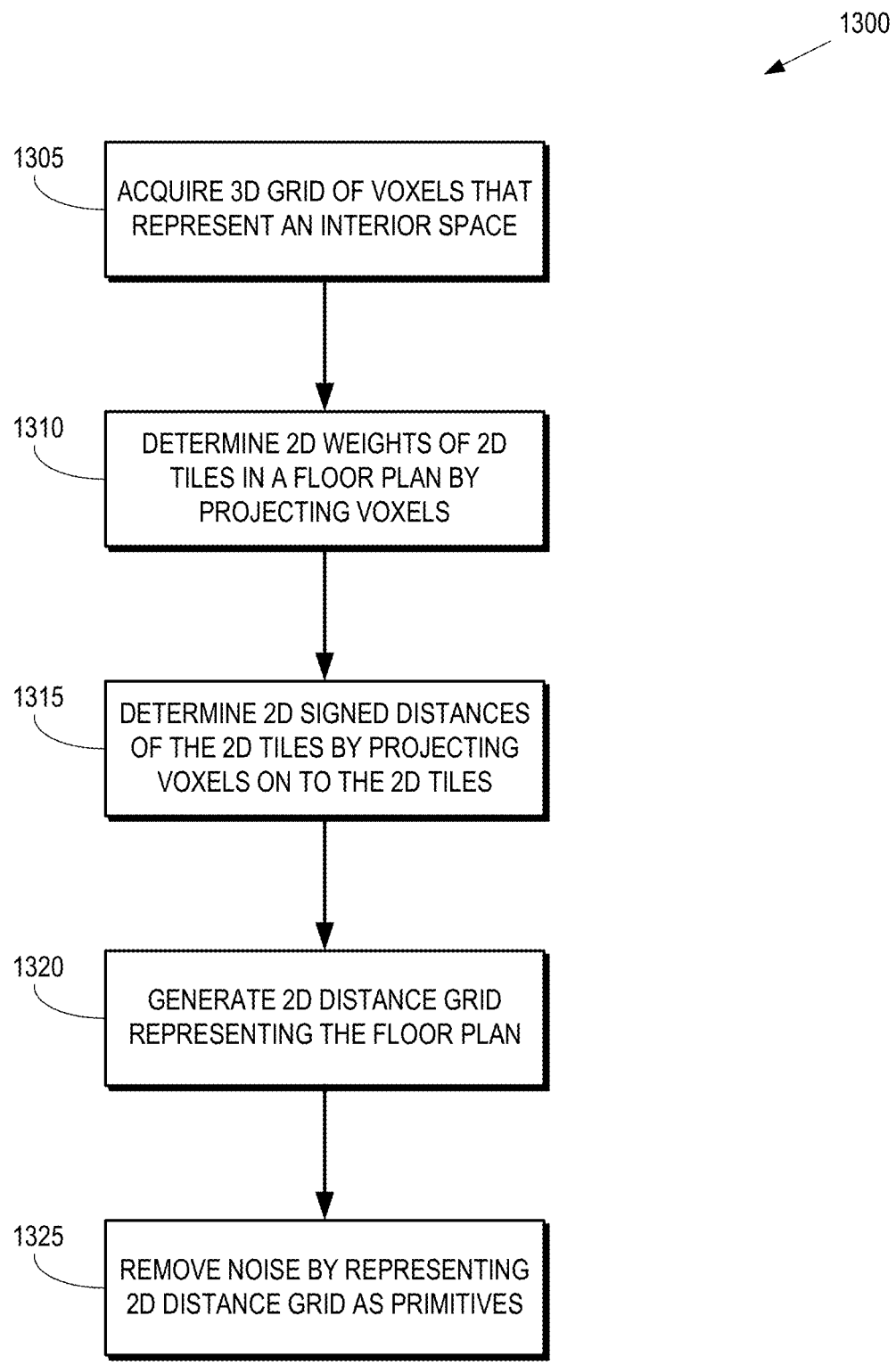
FIG. 13 is a flow diagram of a method of generating a 2D floor plan from a 3D grid of voxels according to some embodiments.

FIG. 13 is a flow diagram of a method 1300 of generating a 2D floor plan from a 3D grid of voxels according to some embodiments. The method 1300 is implemented in some embodiments of the electronic device 110 shown in FIGS. 1, 2, and 3, the user equipment 505 shown in FIG. 5, and the user equipment 1005 shown in FIG. 10.

At block 1305, a 3D grid of voxels that represent an interior space is acquired. As discussed herein, in some embodiments, the 3D grid of voxels is acquired by an electronic device or user equipment that is held by a user as the user moves through the interior space. However, in other embodiments, the 3D grid of voxels can be acquired using other image acquisition and depth sensing equipment, which may or may not be implemented in a single device that can be carried by a user. Furthermore, the 3D grid of voxels can be acquired by one system and then processed according to the method 1300 by another system.

At block 1310, the user equipment determines 2D weights of 2D tiles in a floor plan by projecting the voxels in the 3D grid into a plane of the floor plan. At block 1315, the user equipment determines 2D signed distances of the 2D tiles by projecting values of the 3D signed distances for voxels in the 3D grid. At block 1320, the user generates a 2D distance grid that represents the 2D floor plan. For example, the user equipment can generate a 2D distance grid such as the 2D distance grid 700 shown in FIG. 7.

At block 1325, the user equipment reduces or removes noise in the 2D distance grid by generating a set of primitives that represent the 2D distance grid. For example, the user equipment can generate the set of primitives using an iterative process that selects primitives based on a cost function as illustrated in FIG. 8.

Figure 14:
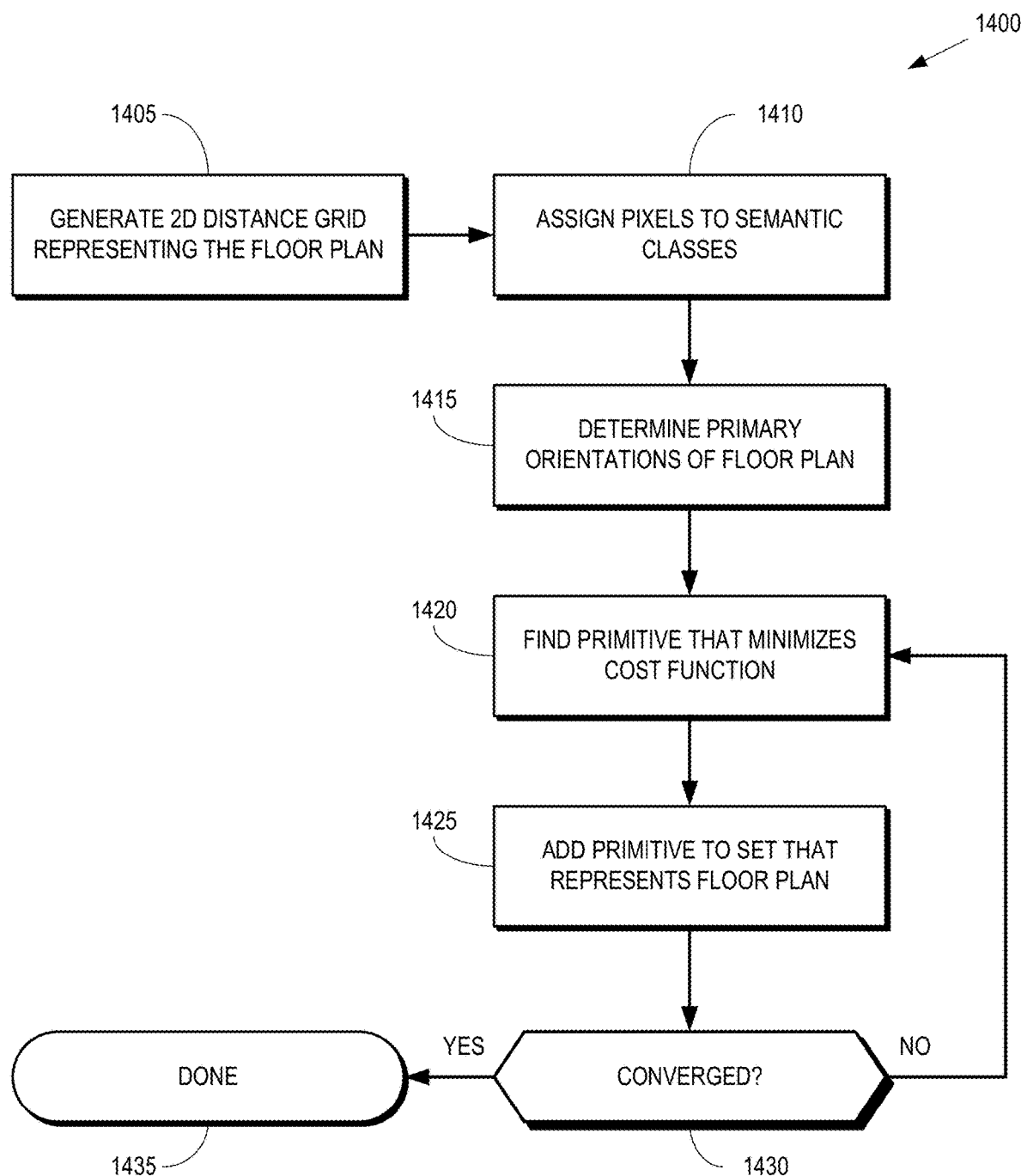
FIG. 14 is a flow diagram of a method of iteratively selecting a set of primitives that represents a 2D distance grid according to some embodiments.

FIG. 14 is a flow diagram of a method 1400 of iteratively selecting a set of primitives that represents a 2D distance grid according to some embodiments. The method 1400 is implemented in some embodiments of the electronic device 110 shown in FIGS. 1, 2, and 3, the user equipment 505 shown in FIG. 5, and the user equipment 1005 shown in FIG. 10.

At block 1405, the user equipment generates a 2D distance grid that represents the floor plan. As discussed herein, the 2D distance grid is generated by projecting values of 3D voxels into a plane of the floor plan. At block 1410, the pixels in the 2D distance grid are assigned to semantic classes such as walls, free space, and unknown. Other semantic classes include furniture, doors, windows, and the like.

At block 1415, the user equipment determines primary orientations of the floor plan. Some embodiments of the user equipment determine the primary orientations by constructing a histogram of weighted gradients that are determined based on the 2D distance grid. The primary orientations are determined by identifying peaks in the histogram that correspond to different orientations.

At block 1420, the user equipment finds a primitive that minimizes a cost function. During the first iteration, the user equipment selects a single primitive to represent the floor plan. During subsequent iterations, the user equipment selects a primitive that minimizes the cost function for the currently selected primitive when combined with the previously selected primitives. At block 1425, the selected primitive is added to the set of primitives that represent the floor plan.

At decision block 1430, the user equipment determines whether the iterative selection process has converged. Some embodiments of the iterative selection process converge in response to a difference in a value of the cost function from one iteration to the other falling below a predetermined threshold. If the iterative selection process has converged, the method 1400 flows to termination block 1435 and the method 1400 ends. If the iterative selection process has not converged, the method 1400 flows back to block 1420 and the user equipment selects another primitive that minimizes the cost function.

Figure 15:
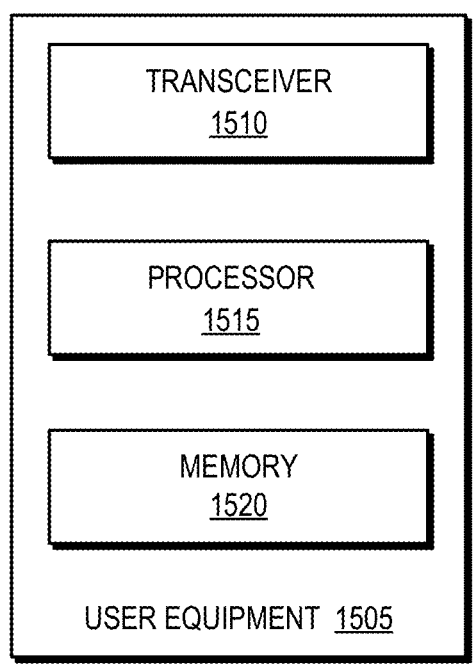
FIG. 15 is a block diagram of an electronic device that is configured to generate a 2D floor plan by vertically projecting values of 3D voxels according to some embodiments.

FIG. 15 is a block diagram of an electronic device 1500 that is configured to generate a 2D floor plan by vertically projecting values of 3D voxels according to some embodiments. The electronic device 1500 is used to implement some embodiments of the electronic device 110 shown in FIGS. 1, 2, and 3, the user equipment 505 shown in FIG. 5, and the user equipment 1005 shown in FIG. 10.

The electronic device 1500 includes a transceiver 1505 that is used to support communication with other devices. Some embodiments of the electronic device 1500 are implemented in user equipment, in which case the transceiver 1505 is configured to support communication over an air interface. The electronic device 1500 also includes a processor 1510 and a memory 1515. The processor 1510 is configured to execute instructions such as instructions stored in the memory 1515 and the memory 1515 is configured to store instructions, data that is to be operated upon by the instructions, or the results of instructions performed by the processor 1510. The electronic device 1500 is therefore able to implement some embodiments of the method 1300 shown in FIG. 13 and the method 1400 shown in FIG. 14.

Figure 16:
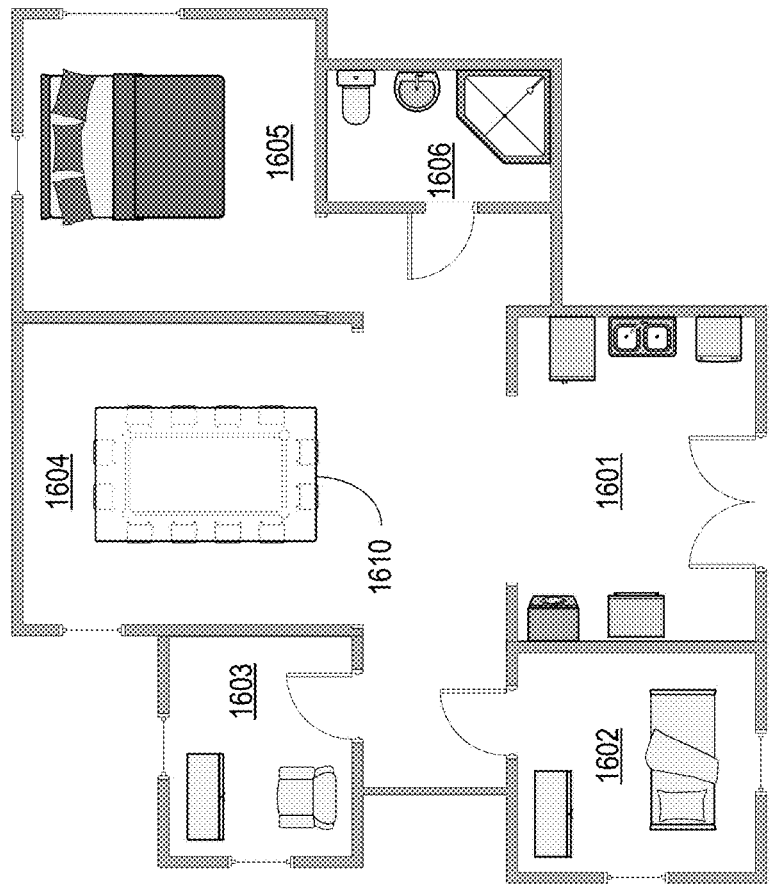
FIG. 16 illustrates a top-down view of an interior space of a building that includes various pieces of furniture according to some embodiments.

FIG. 16 illustrates a top-down view of an interior space 1600 of a building that includes various pieces of furniture according to some embodiments. Some embodiments of the interior space 100 shown in FIG. 1 correspond to a portion of the top-down view 1600. Although the top-down view of the interior space 1600 is shown from directly above the interior space 1600, other views from more oblique angles can also be used. The interior space 1600 is subdivided into several rooms including a kitchen 1601, a bedroom 1602, a library 1603, a dining room 1604, a bedroom 1605, and a bathroom 1606, which are collectively referred to herein as "the rooms 1601-1606." Some embodiments of the interior space 1600 include more or fewer rooms.

The rooms 1601-1606 include pieces of furniture such as a table 1610. The rooms 1601-1606 also include other pieces of furniture such as chairs, beds, dressers, bookshelves, toilets, sinks, showers, washing machines, refrigerators, ovens, stoves, dishwashers, and the like. In the interest of clarity, the other pieces of furniture are not indicated by reference numerals. As used herein, the term "furniture" refers to any object located within the interior space 1600 including the specific pieces of furniture disclosed herein, as well as other objects that are located within one or more of the rooms 1601-1606.

As discussed herein, a 3D scan of the interior space 1600 is acquired using an electronic device such as the electronic device 110 shown in FIG. 1. Some embodiments of the 3D scan represent the interior space 1600 using color information and depth information acquired for each pixel in the 3D scan. For example, the color information can include red-green-blue (RGB) values to represent the pixel and a depth value to indicate a depth of the pixel. The depth information is represented as a distance from the camera performing the 3D scan to a surface of an object in the interior space 1600 that is represented by the pixel, as a distance of the surface from a reference point in the interior space 1600, or as a distance relative to some other location. A 3D mesh is generated from the 3D scan, e.g., using a marching cubes algorithm, and then the RGB images are projected onto the 3D mesh to generate a textured 3D mesh.

Labels are assigned to portions of the interior space 1600 based on the 3D scan. In some embodiments, the labels are selected using a trained convolutional neural network (CNN) that analyzes color and depth images of the interior space 1600. The labels are selected from a set that includes labels indicating a bathroom, a bedroom, a living room, a kitchen, an office, and an unknown label for portions of the 3D scan that the CNN is unable to identify. For example, the CNN labels the room 1604 with the label "dining room" based on the presence of the table 1610 and the chairs surrounding the table. For another example, the CNN labels the room 1601 with the label "kitchen" because the room 1601 includes a washing machine, a dishwasher, a refrigerator, a kitchen sink, and a stove.

Figure 17:
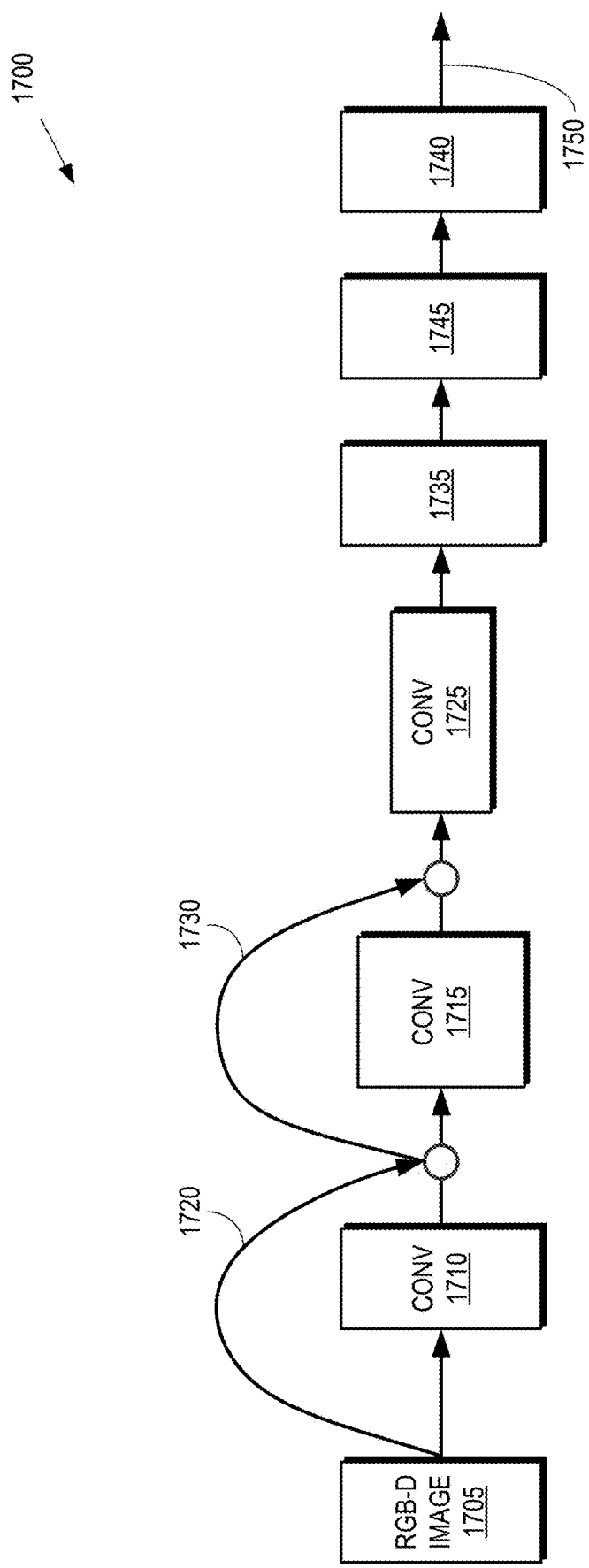
FIG. 17 is a block diagram of a convolutional neural network (CNN) that is trained to label portions of an interior space based on furniture located in the portions of the interior space according to some embodiments.

FIG. 17 is a block diagram of a CNN 1700 that is trained to label portions of an interior space based on furniture located in the portions of the interior space according to some embodiments. The CNN 1700 is used to analyze some embodiments of the interior space 1600 shown in FIG. 16 based on furniture distributed throughout the interior space 1600. In the illustrated embodiment, the CNN 1700 is implemented as a residual network. However, other embodiments of the CNN 1700 are implemented as different types of neural networks.

Input 1705 to the CNN 1700 includes a 2D color image representing the interior space. The input 1705 also includes a corresponding 2D depth image to indicate depths of each location within the interior space. In the illustrated embodiment, the 2D color image and depth images are generated from a textured 3D mesh that is generated based on a 3D scan of the interior space. For example, the input 1705 can include a RGB-D image of the interior space generated from a 3D scan captured by an electronic device such as the electronic device 110 shown in FIG. 1. A position of the ceiling and a ground plane are estimated and used to render the textured 3D mesh in a bird's eye view with the ground plane at z=0 and a near-field clipping plane positioned slightly below the level of the ceiling. The 2D color image represents the colors of the objects in the interior space (as seen from the bird's eye view) and the 2D depth image represents the depths of objects in the interior space as shades of grey, e.g., ranging from black at floor level to white at ceiling level. The 2D color image and the 2D depth image are rendered at a predetermined resolution such as one pixel per centimeter. In the illustrated embodiment, the 2D color and depth images in the input 1705 are subdivided into overlapping tiles. For example, the input 1705 can be rendered in overlapping tiles that are 2 meters (m)×2 m in size. The CNN 1700 uses the overlapping tiles to classify portions of the input 1705 at a lower granularity, such as 0.3 m×0.3 m.

Convolutional layer 1710 receives the input 1705. The convolutional layer 1710 implements a convolutional function that is defined by a set of parameters, which are trained on the basis of one or more training datasets. The parameters include a set of learnable filters (or kernels) that have a small receptive field and extend through a full depth of an input volume of the convolutional layer 1710. The parameters can also include a depth parameter, a stride parameter, and a zero-padding parameter that control the size of the output volume of the convolutional layer 1710. The convolutional layer 1710 applies a convolution operation to the input 1705 and provides the results of the convolution operation to a subsequent convolutional layer 1715. The CNN 1700 also includes an identity shortcut connection 1720 that allows an identity portion of the input 1705 to bypass the convolutional layers 1710. In the illustrated embodiment, the CNN 1700 includes additional convolutional layers 1725 and an additional identity shortcut connection 1730. Some embodiments of the CNN 1700 include more or fewer convolutional layers or identity shortcut connections.

Results of the convolution operations performed by the convolutional layers 1710, 1715, 1725 are provided to fully connected layers 1735, 1740 and DO layer 1745. The neurons in the fully connected layers 1735, 1740 are connected to every neuron in another layer, such as the convolutional layers 1725 or the other fully connected layers. The fully connected layers 1735, 1740 typically implement functionality that represents the high-level reasoning that produces an output 1750 that represents the labels generated by the CNN 1700. For example, if the CNN 1700 is trained to perform image recognition, the fully connected layers 1735, 1740 implement the functionality that labels portions of the image that have been "recognized" by the CNN 1700. For example, the fully connected layers 1735, 1740 can recognize portions of an interior space as rooms that have a particular function, in which case the fully connected layers 1735, 1740 label the portions using the corresponding room labels. The functions implemented in the fully connected layers 1735, 1740 are represented by values of parameters that are determined using a training dataset, as discussed herein.

The output 1750 of the CNN 1700 is a vector that represents probabilities that a portion of the interior space is labeled as one of a set of labels indicating a room type, such as a bathroom, a bedroom, a living room, a kitchen, an office, and the like. The CNN 1700 is able to label the portions of the interior space because the presence or absence of certain objects (or combinations thereof) provides a constraint on the type of the room that includes the objects. For example, sinks are typically found in both kitchens and bathrooms, chairs are found in all types of room but seldomly in bathrooms, and beds are found in bedrooms. Thus, identifying a sink and a chair in a room makes it more likely that the room is a kitchen than a bathroom. An unknown label is assigned portions of the interior space that the CNN 1700 is unable to identify. Including the unknown label is useful because the problem of identifying a room type for a portion of an interior space is ill-posed. For example, if a 2 m×2 m portion of a 2D color and depth image only shows a tiled white floor, the CNN 1700 will not have any information with which to identify the room type. Labeling some portions of the input 1705 as "unknown" effectively allows the CNN 1700 to avoid choosing a particular room type in cases where it is difficult or impossible to identify the room type based on the available information.

FIG. 18 is a block diagram illustrating a tile 1800 and a set 1805 of overlapping tiles that are provided as input to a CNN according to some embodiments. The tile 1800 and the set 1805 of overlapping tiles are provided to some embodiments of the CNN 1700 shown in FIG. 17. The tile 1800 encompasses a plurality of pixels 1810. Only one pixel is indicated by a reference numeral in the interest of clarity. The CNN identifies a label for the tile 1800, as discussed herein, and then assigns the label to the central pixel 1810 of the tile 1800. The information represented by the tile 1800 does not always provide an accurate context for the central pixel 1810, which decreases the accuracy of the label applied to the central pixel 1810 solely on the basis of the information included in the tile 1800. The CNN therefore processes the overlapping tiles 1805 to identify a label of a pixel 1815 that is overlapped by each of the overlapping tiles 1805. Although four overlapping tiles 1805 are shown in FIG. 18, more or fewer overlapping tiles are used to identify the label of the pixel 1815 in some embodiments.

Figure 19:
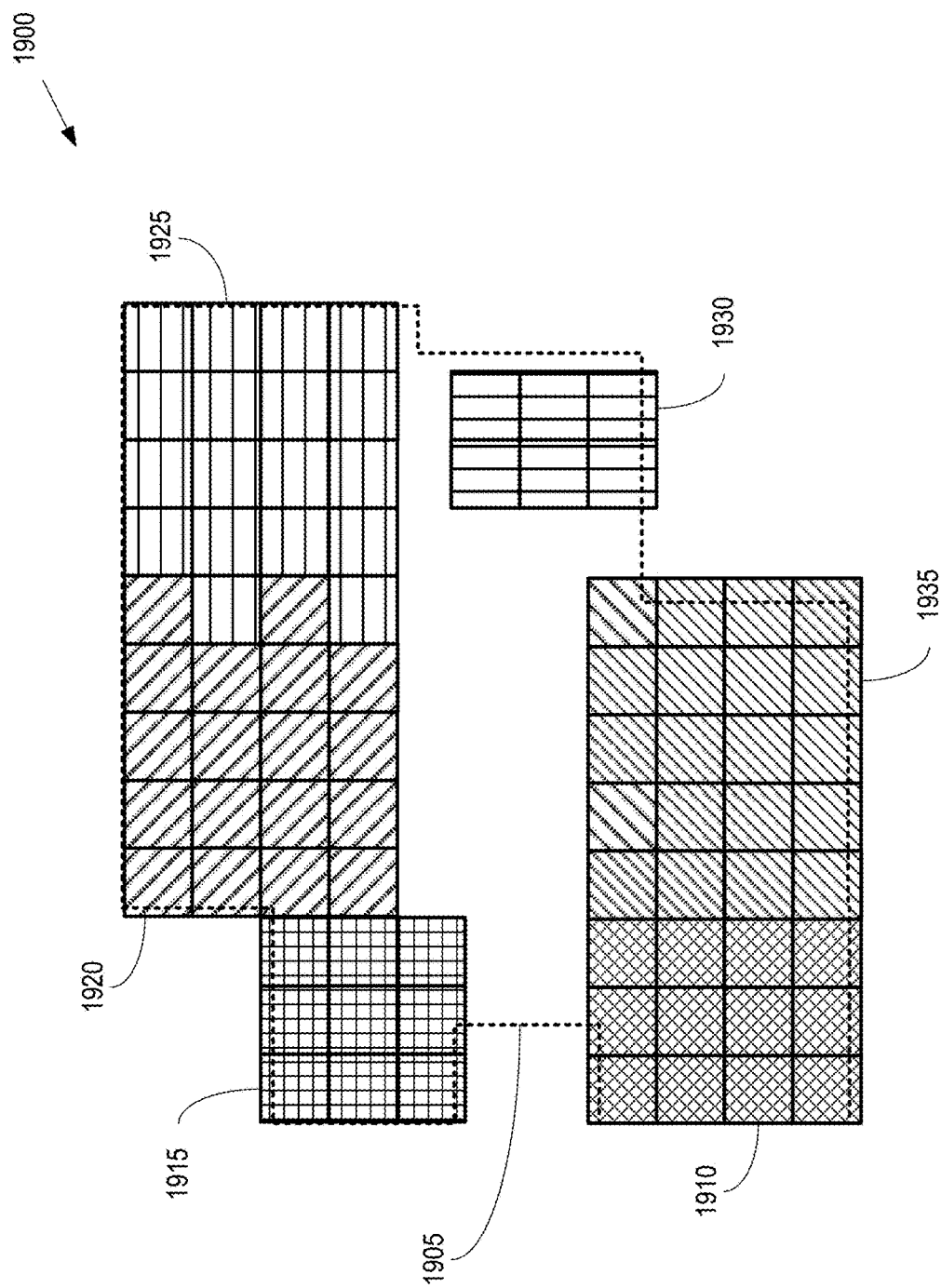
FIG. 19 is a block diagram of a map of labeled tiles that is superimposed upon an outline of an interior space according to some embodiments.

FIG. 19 is a block diagram of a map 1900 of labeled tiles that is superimposed upon an outline 1905 of an interior space according to some embodiments. The map 1900 is generated by some embodiments of the CNN 1700 shown in FIG. 17. In the illustrated embodiment, the CNN labels the tiles 1910 (only one indicated by a reference numeral in the interest of clarity) with the label "bedroom," as indicated by the crosshatching in the tiles 1910. The CNN labels the tiles 1915 (only one indicated by a reference numeral in the interest of clarity) with the label "library," as indicated by the vertical/horizontal crosshatching in the tiles 1915. The CNN labels the tiles 1920 (only one indicated by a reference numeral in the interest of clarity) with the label "dining room," as indicated by the fill lines directed downward from left to right. The CNN labels the tiles 1925 (only one indicated by a reference numeral in the interest of clarity) with the label "bedroom," as indicated by the horizontal fill lines. The CNN labels the tiles 1930 (only one indicated by a reference numeral in the interest of clarity) with the label "bathroom," as indicated by the vertical fill lines. The CNN labels the tiles 1935 (only one indicated by a reference numeral in the interest of clarity) with the label "kitchen," as indicated by the fill lines directed upward from left to right.

Figure 20:
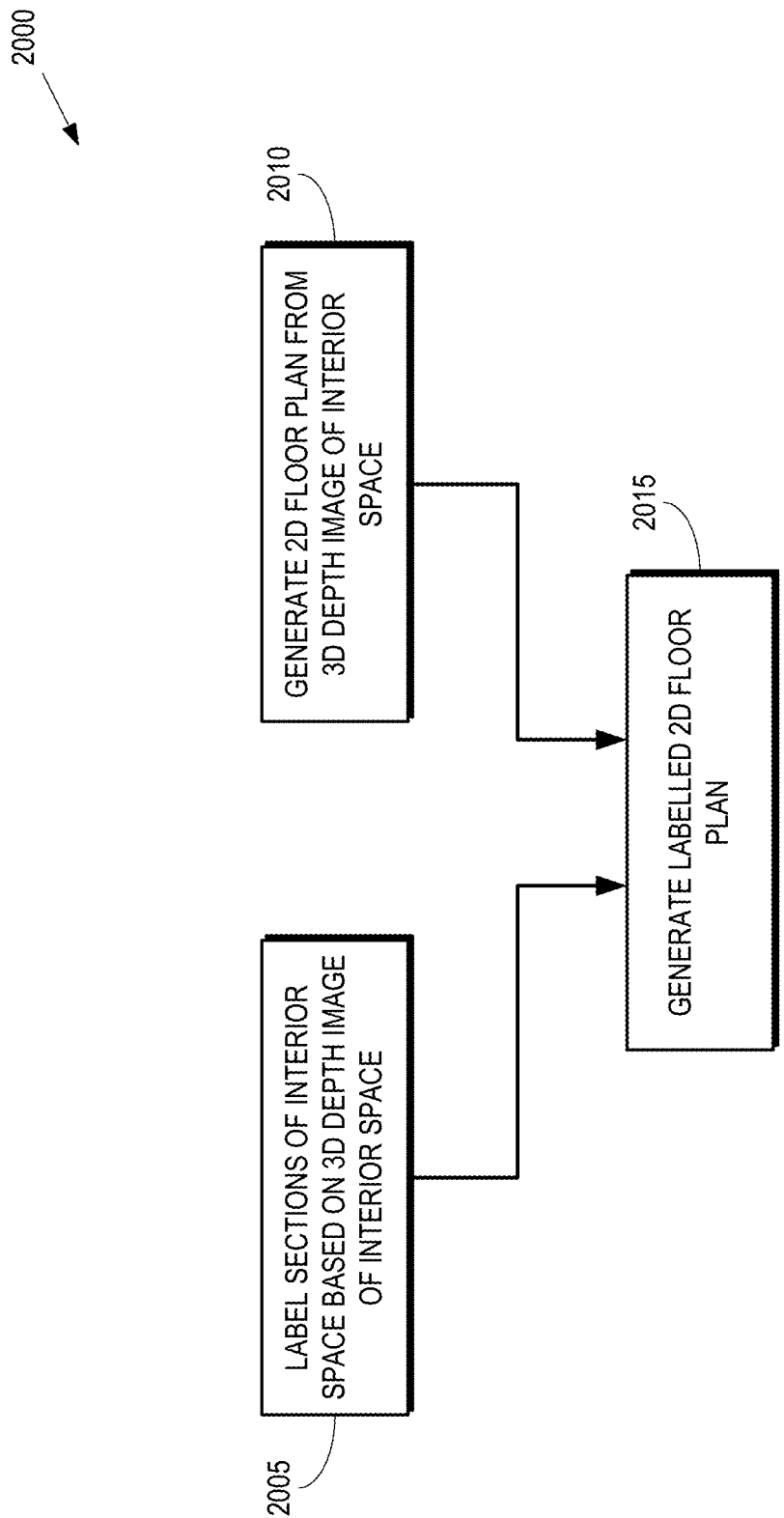
FIG. 20 is a flow diagram of a method of labeling portions of a floor plan of an interior space according to some embodiments.

FIG. 20 is a flow diagram of a method 2000 of labeling portions of a floor plan of an interior space according to some embodiments. The method 2000 is implemented in some embodiments of the electronic device 110 shown in FIG. 1. At block 2005, the electronic device labels sections of an interior space based on a 3D depth image of the interior space. Some embodiments of the electronic device label the sections of the interior space using a CNN such as the CNN 1700 shown in FIG. 17. At block 2010, the electronic device generates a 2D distance grid that represents a 2D floorplan of the interior space. Some embodiments of the electronic device generate the 2D distance grid that represents the floorplan in accordance with the method 1400 shown in FIG. 14. The operations performed at blocks 2005, 2010 can be performed concurrently, sequentially, at different times, or in parallel. At block 2010, the electronic device generates a labeled 2D floor plan. For example, the electronic device can identify a pixel or group of pixels near a central location within the labeled regions of the 2D floorplan and then associate the label for the region with the pixel or group of pixels.

Figure 21:
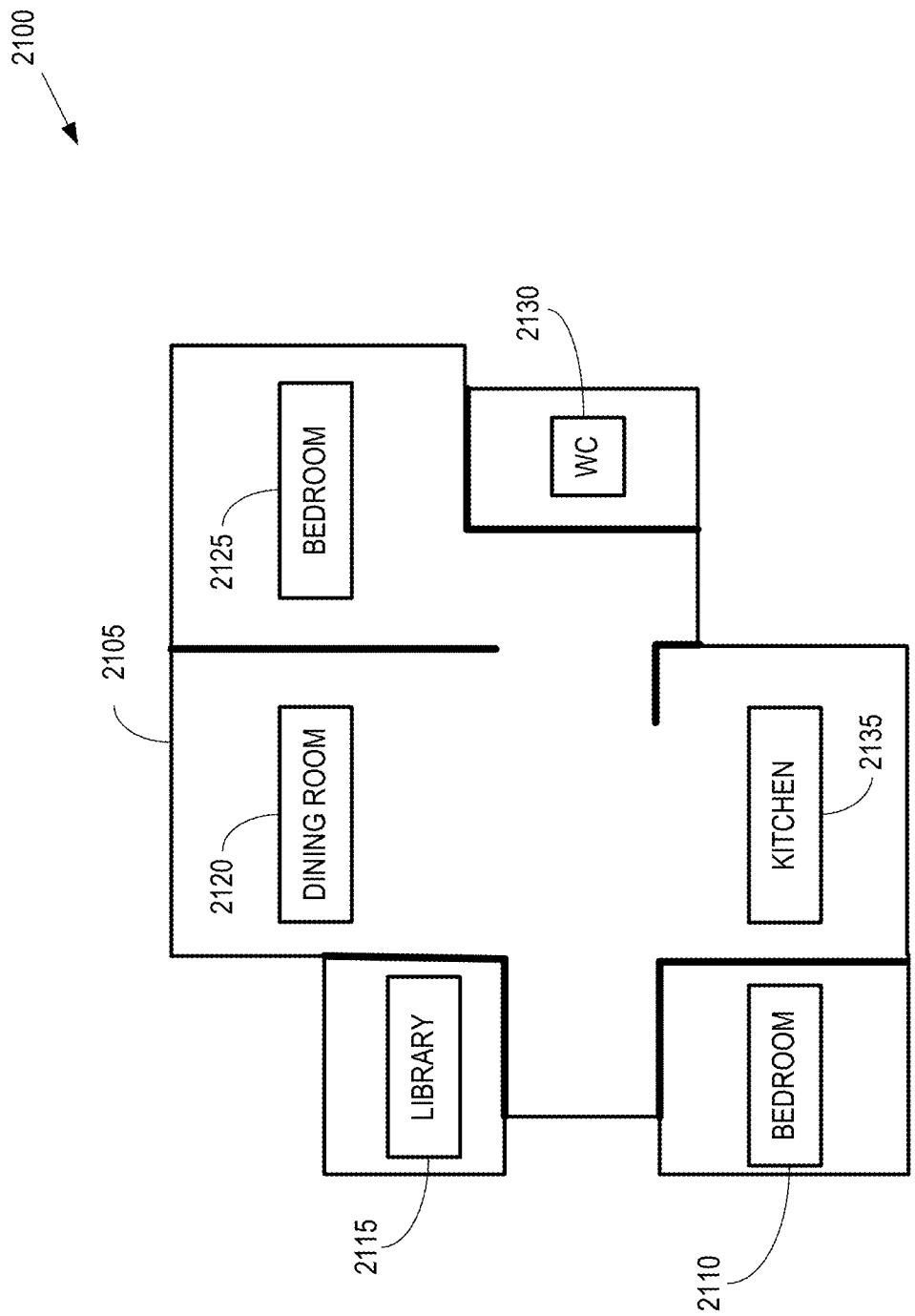
FIG. 21 illustrates a labeled 2D floorplan according to some embodiments.

FIG. 21 illustrates a labeled 2D floorplan 2100 according to some embodiments. The labeled 2D floorplan 2100 includes a 2D floorplan 2105 such as a 2D floorplan represented by the set 820 of polygons shown in FIG. 8. The labeled 2D floorplan 2100 includes a first label 2110 that indicates that a corresponding portion of the 2D floorplan 2105 represents a bedroom, a second label 2115 that indicates that a corresponding portion of the 2D floorplan 2105 represents a library, a third label 2120 that indicates that a corresponding portion of the 2D floorplan 2105 represents a dining room, a fourth label 2125 that indicates that a corresponding portion of the 2D floorplan 2105 represents a bedroom, a fifth label 2130 that indicates that a corresponding portion of the 2D floorplan 2105 represents a bathroom (WC), and a sixth label 2135 that indicates that a corresponding portion of the 2D floorplan 2105 represents a kitchen.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    performing a three-dimensional (3D) scan of an interior space;
    accessing voxels in a 3D grid that is generated from the 3D scan, wherein the voxels represent portions of the volume of the interior space and wherein the voxels have associated weights that indicate a number of observations that include the corresponding portion of the volume of the interior space and signed distances relative to surfaces associated with the voxels;
    projecting the voxels onto tiles in a two-dimensional (2D) floor plan of the interior space by combining the weights associated with the voxels to determine a set of 2D weights for the tiles; and
    generating, based on the tiles, a 2D distance grid that represents features in the interior space.

2. The method of claim 1, wherein generating the 2D distance grid comprises generating the 2D distance grid in real-time concurrently with performing the 3D scan of the interior space.

3. The method of claim 2, wherein accessing the voxels in the 3D grid comprises accessing subsets of the voxels that have been modified while performing the 3D scan during a previous time interval.

4. The method of claim 3, wherein accessing the subsets of the voxels comprises accessing a predetermined number of voxels within a volume that includes at least one voxel that was modified during the previous time interval.

5. The method of claim 3, wherein generating the 2D distance grid comprises selectively updating a portion of the 2D distance grid associated with the subsets of the voxels that have been modified and bypassing updating a different portion of the 2D distance grid associated with the other subsets of the voxels that were not modified during the previous time interval.

6. The method of claim 1, wherein projecting the voxels onto the tiles comprises summing the weights associated with the voxels along a vertical direction that is perpendicular to a plane that includes the 2D floor plan to determine the 2D weights for the tiles.

7. The method of claim 6, wherein projecting the voxels onto the tiles comprises summing a product of the weights associated with the voxels and the signed distances of the voxels along the vertical direction to determine weighted 2D signed distances for the tiles.

8. The method of claim 7, wherein projecting the voxels onto the tiles comprises normalizing the weighted 2D signed distances by the corresponding 2D weights of the tiles.

9. The method of claim 1, further comprising:
    extracting, from the 3D grid, at least one of a height of a highest surface that is visible from above, a height of a lowest surface that is visible from below, and a ratio of free space to occupied space in a vertical band.

10. The method of claim 1, wherein generating the 2D distance grid comprises generating values of pixels that represent the features in the interior space.

11. The method of claim 10, wherein generating the 2D distance grid comprises generating a raw version of a polygonised floor plan using a marching squares algorithm.

12. The method of claim 10, wherein the features comprise at least one of walls, free space, furniture, doors, and windows.

13. The method of claim 10, further comprising:
    identifying a set of primitives that represent the features of the 2D distance grid.

14. The method of claim 13, wherein the primitives comprise at least one of a line, a circle, a triangle, a rectangle, or another polygon.

15. The method of claim 13, wherein identifying the set of primitives comprises iteratively selecting a primitive that minimizes a cost function when the primitive is added to the set of primitives, and wherein the cost function indicates how well the set of primitives matches the 2D distance grid.

16. The method of claim 1, further comprising:
    assigning labels to portions of the interior space based on features in the 3D scan, wherein the labels indicate room types.

17. The method of claim 16, further comprising:
    training a convolutional neural network (CNN) to assign the labels based on different types of furniture that are represented in the 3D scan of the portions of the interior space, wherein the CNN is trained using a set of training images including color information and depth information for each pixel.

18. The method of claim 17, wherein training the convolutional neural network comprises training the CNN to assign labels comprising labels indicating a bathroom, a bedroom, a living room, a kitchen, an office, and an unknown label for portions of the 3D scan that the CNN is unable to identify.

19. The method of claim 16, further comprising:
    generating a labeled 2D distance grid by associating the labels with portions of the 2D distance grid that correspond the portions of the interior space that were assigned the labels based on the features in the 3D scan.

20. An electronic device comprising:
    an imaging camera and a depth camera configured to perform a 3D scan of an interior space; and
    a processor configured to
        generate voxels in a three-dimensional (3D) grid based on the 3D scan, wherein the voxels represent portions of the volume of the interior space and wherein the voxels have values of weights that indicate a number of observations that include the corresponding portion of the volume of the interior space and values of signed distances relative to surfaces associated with the voxels;
        project the voxels onto tiles in a two-dimensional (2D) floor plan of the interior space by combining the weights associated with the voxels to determine a set of 2D weights for the tiles; and
        generate, based on the tiles, a 2D distance grid that represents features in the interior space.

21. The electronic device of claim 20, wherein the processor is configured to generate the 2D distance grid in real-time concurrently with the imaging camera and the depth camera performing the 3D scan of the interior space.

22. The electronic device of claim 21, wherein the processor is configured to modify subsets of the voxels concurrently with the imaging camera and the depth camera performing the 3D scan during a time interval.

23. The electronic device of claim 21, wherein the processor is configured to group predetermined numbers of voxels within volumes.

24. The electronic device of claim 23, wherein the processor is configured to selectively update a portion of the 2D distance grid associated with a subset of voxels that are in a volume that includes at least one voxel that was modified during a previous time interval, and the processor is configured to bypass updating a different portion of the 2D distance grid associated with other subsets of the voxels that were not in a volume that included at least one voxel that was modified during the previous time interval.

25. The electronic device of claim 20, wherein the processor is configured to sum the weights associated with the voxels along a vertical direction that is perpendicular to a plane that includes the 2D floor plan to determine the 2D weights for the tiles.

26. The electronic device of claim 25, wherein the processor is configured to sum a product of the weights associated with the voxels and the signed distances of the voxels along the vertical direction to determine weighted 2D signed distances for the tiles.

27. The electronic device of claim 26, wherein the processor is configured to normalize the 2D signed distances by the corresponding 2D weights of the tiles.

28. The electronic device of claim 20, wherein the processor is configured to extract, from the 3D grid, at least one of a height of a highest surface that is visible from above, a height of a lowest surface that is visible from below, and a ratio of free space to occupied space in a vertical band.

29. The electronic device of claim 20, wherein the processor is configured to generate values of pixels that represent the features in the interior space.

30. The electronic device of claim 29, wherein the features comprise at least one of walls, free space, furniture, doors, and windows.

31. The electronic device of claim 29, wherein the processor is configured to identify a set of primitives that represent the features of the 2D distance grid.

32. The electronic device of claim 31, wherein the primitives comprise at least one of a line, a circle, a triangle, a rectangle, or another polygon.

33. The electronic device of claim 31, wherein the processor is configured to iteratively select a primitive that minimizes a cost function when the primitive is added to the set of primitives, and wherein the cost function indicates how well the set of primitives matches the 2D distance grid.

34. The electronic device of claim 20, wherein the processor is configured to assign labels to portions of the interior space based on features in the 3D scan, wherein the labels indicate room types.

35. The electronic device of claim 34, wherein the processor is configured to assign labels based on a convolutional neural network (CNN) that is trained to assign the labels based on different types of furniture that are represented in the 3D scan of the portions of the interior space, wherein the CNN is trained using a set of training images including color information and depth information for each pixel.

36. The electronic device of claim 35, wherein the CNN is trained to assign labels comprising labels indicating a bathroom, a bedroom, a living room, a kitchen, an office, and an unknown label for portions of the 3D scan that the CNN is unable to identify.

37. The electronic device of claim 34, wherein the processor is configured to generate a labeled 2D distance grid by associating the labels with portions of the 2D distance grid that correspond the portions of the interior space that were assigned the labels based on the features in the 3D scan.

38. A method comprising:
projecting voxels in a three-dimensional (3D) grid onto tiles in a two-dimensional (2D) floor plan by combining weights associated with the voxels to determine a set of weights for the tiles, wherein the voxels are generated from a 3D scan of an interior space, wherein projecting the voxels is performed concurrently with performing the 3D scan, and wherein the voxels represent portions of the volume of the interior space and have values of the weights that indicate a number of observations that include the corresponding portion of the volume of the interior space and values of signed distances relative to surfaces associated with the voxels;
generating, based on the tiles, a 2D distance grid that represents features in the interior space; and
identifying a set of primitives that represent the 2D distance grid.

39. The method of claim 38, wherein projecting the voxels onto the tiles concurrently with performing the 3D scan comprises projecting values of the voxels acquired onto the tiles concurrently with performing the 3D scan to modify previously acquired values of voxels or acquire values of new voxels.

40. The method of claim 39, wherein the voxels are grouped into volumes that include a predetermined number of voxels, and wherein generating the 2D distance grid comprises modifying a subset of the tiles that are associated with volumes that include at least one voxel having a value that was previously modified by performing the 3D scan.

41. The method of claim 38, wherein identifying the set of primitives comprises iteratively selecting a primitive that minimizes a cost function when the primitive is added to the set of primitives, and wherein the cost function indicates how well the set of primitives matches the 2D distance grid.

42. The method of claim 38, further comprising:
labeling subsets of the sets of primitives based on features in the 3D scan, wherein the labels indicate room types.

* * * * *